United States Patent
Lee et al.

(10) Patent No.: US 9,143,589 B2
(45) Date of Patent: Sep. 22, 2015

(54) MOBILE TERMINAL INTENDED TO MORE EFFICIENTLY DISPLAY CONTENT ON THE MOBILE TERMINAL AND METHOD FOR CONTROLLING THE SAME

(71) Applicant: LG ELECTRONICS INC., Seoul (KR)

(72) Inventors: Bokheun Lee, Seoul (KR); Taeyoung Jeon, Seoul (KR); Sungchae Na, Seoul (KR)

(73) Assignee: LG ELECTRONICS INC., Seoul (JP)

( * ) Notice: Subject to any disclaimer, the term of this patent is extended or adjusted under 35 U.S.C. 154(b) by 212 days.

(21) Appl. No.: 13/910,008

(22) Filed: Jun. 4, 2013

(65) Prior Publication Data

US 2013/0324192 A1    Dec. 5, 2013

(30) Foreign Application Priority Data

Jun. 5, 2012 (KR) .......................... 10-2012-0060223

(51) Int. Cl.
*H04M 1/00* (2006.01)
*H04M 1/02* (2006.01)
*H04M 1/725* (2006.01)

(52) U.S. Cl.
CPC ........ *H04M 1/0266* (2013.01); *H04M 1/72544* (2013.01)

(58) Field of Classification Search
CPC .......... H04N 21/8549; H04N 1/00294; H04N 1/0044; H04N 1/215; H04N 2101/00; H04N 2201/0067; H04N 5/23293; H04N 1/00442; G06F 17/30849; G06F 17/30781; G06F 17/30852; G06F 9/4443
See application file for complete search history.

(56) References Cited

U.S. PATENT DOCUMENTS

| | | | |
|---|---|---|---|
| 2008/0209323 A1* | 8/2008 | Park | 715/716 |
| 2009/0129741 A1* | 5/2009 | Kim | 386/52 |
| 2010/0235733 A1* | 9/2010 | Drislane et al. | 715/702 |
| 2011/0138321 A1* | 6/2011 | Allen et al. | 715/786 |
| 2011/0167347 A1* | 7/2011 | Joo et al. | 715/716 |

* cited by examiner

*Primary Examiner* — Golam Sorowar
(74) *Attorney, Agent, or Firm* — Lee, Hong, Degerman, Kang & Waimey

(57) ABSTRACT

A mobile terminal is disclosed. The mobile terminal displays a progress bar for controlling the playback of content, selects two points on the progress bar, and upon receipt of a predetermined operation on the two points, controls the playback of the content, which has a playback portion between the two points. Accordingly, time-based content can be managed more efficiently through the progress bar.

21 Claims, 40 Drawing Sheets

FIG. 20
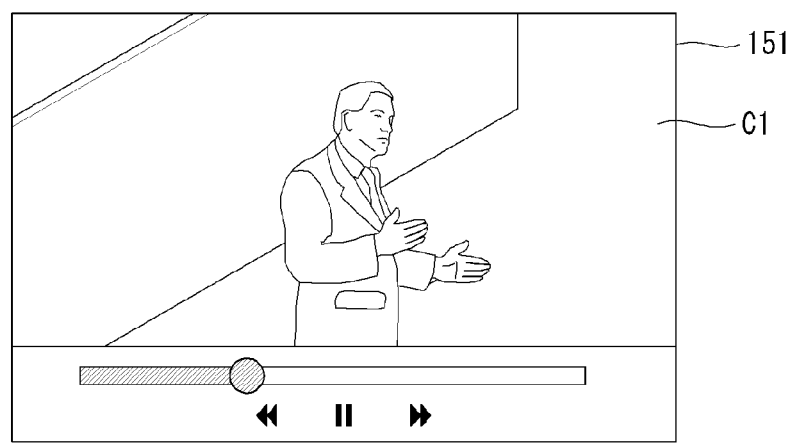
90° 회전
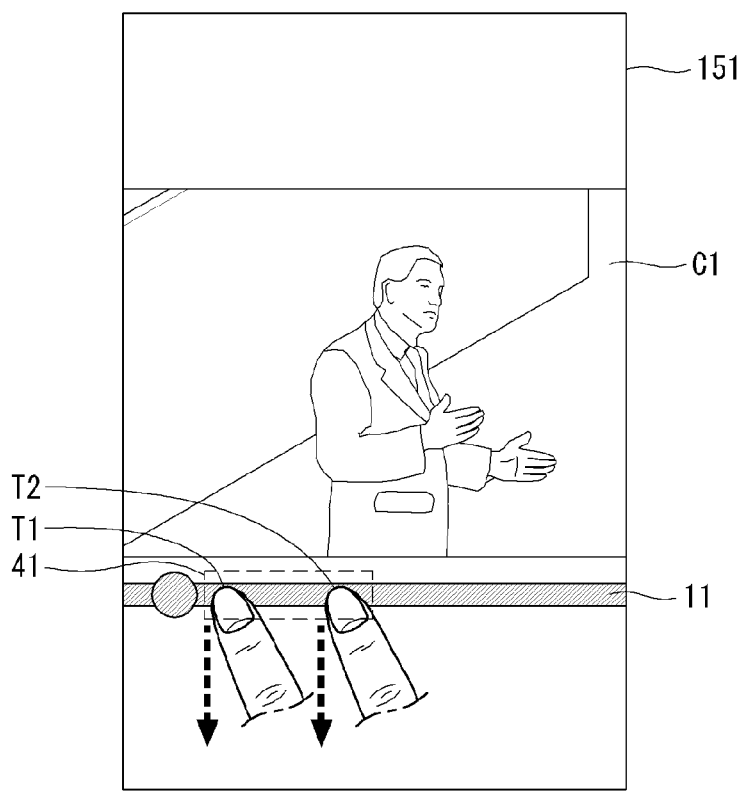

MOBILE TERMINAL INTENDED TO MORE EFFICIENTLY DISPLAY CONTENT ON THE MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Patent Applications No. 10-2012-0060223, filed on 5 Jun., 2012, the contents of which are incorporated by reference herein in their entirety.

BACKGROUND

1. Field

The present invention relates to a mobile terminal and a method for controlling the same, and more particularly, to a mobile terminal which is intended to more efficiently control content to run on the mobile terminal, and a method for controlling the same.

2. Related Art

Along with the rapid development of hardware and software technologies associated with various types of electronic devices including mobile terminals, an electronic device is now capable of providing or storing a wide variety of functions and information. Thus, such a wide variety of information is provided on a screen equipped on the electronic device.

In the case of a mobile terminal having a touch screen, a variety of information provided on the touch screen can be accessed simply by a user's touch operation.

SUMMARY

The present invention has been made in an effort to provide a mobile terminal which can more easily control content running in a way that the user wants by various touch inputs on a progress bar for controlling content running, and a method for controlling the same.

In particular, the present invention has been made in an effort to provide a mobile terminal which can more easily control frames corresponding to a given portion by modifying multi-touch inputs on a progress bar for controlling content running, and a method for controlling the same.

An aspect of the present invention provides a mobile terminal including: a touch screen; and a controller that displays on the touch screen a progress bar for controlling the playback of first content played through the touch screen, and upon receipt of a touch input on a specific portion on the progress bar, displays the first content and second content, the second content being played during the specific portion, on split sections of the touch screen.

Another aspect of the present invention provides a mobile terminal including: a touch screen; and a controller that displays on the touch screen a progress bar for controlling the playback of first content played through the touch screen, and upon receipt of a touch input on a specific portion on the progress bar, displays on the touch screen a user interface for controlling running of second content, the second content being played during the specific portion.

Yet another aspect of the present invention provides a method for controlling a mobile terminal, the method including: playing first content through a touch screen; displaying on the touch screen a progress bar for controlling running of the first content; receiving a touch input on a specific portion of the progress bar; and displaying the first content and second content, the second content being played during the specific portion, on split sections of the touch screen.

A further aspect of the present invention provides a method for controlling a mobile terminal, the method including: playing first content through a touch screen; displaying on the touch screen a progress bar for controlling running of the first content; receiving a touch input on two points designating a specific portion of the progress bar; receiving a drag input for moving the touch input in a predetermined direction; and displaying on the touch screen a user interface for controlling running of second content, the second content being played during the specific portion.

Details of other embodiments are included in the detailed description and drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain aspects and features of the present invention.

In the drawings:

FIGS. 20 to 29b are views for explaining the method for controlling a mobile terminal according to the fourth embodiment of the present invention;

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
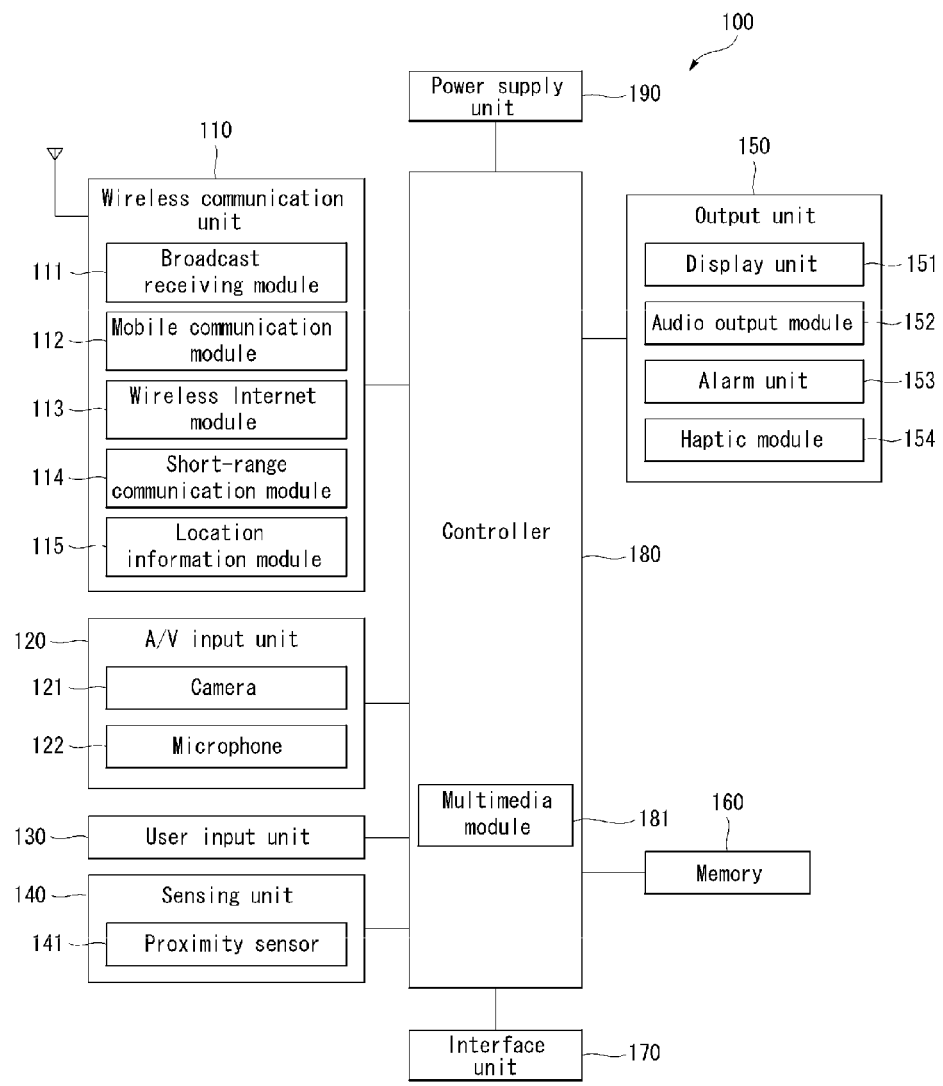
FIG. 1 is a block diagram of a mobile terminal according to an embodiment of this invention.

Referring to FIG. 1, a mobile terminal 100, as an example of the electronic device 100 related to this invention, is described in detail with reference to the accompanying drawings. FIG. 1 is a block diagram of the mobile terminal according to an embodiment of this invention. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a position-location module 115. For non-mobile terminals, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position-location module 115 identifies or otherwise obtains a location of the mobile terminal 100. The position-location module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position-location module 115 is a GPS module. The position-location module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The position-location module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The controller 180 (FIG. 1) recognizes the proximity touch as one of various input signals according to proximity depth and position of the pointer. The controller 180 performs various operation controls according to various input signals.

Referring again to FIG. 1, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components for the mobile terminal 100. The power may be internal power, external power, or combinations thereof.

Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 2:
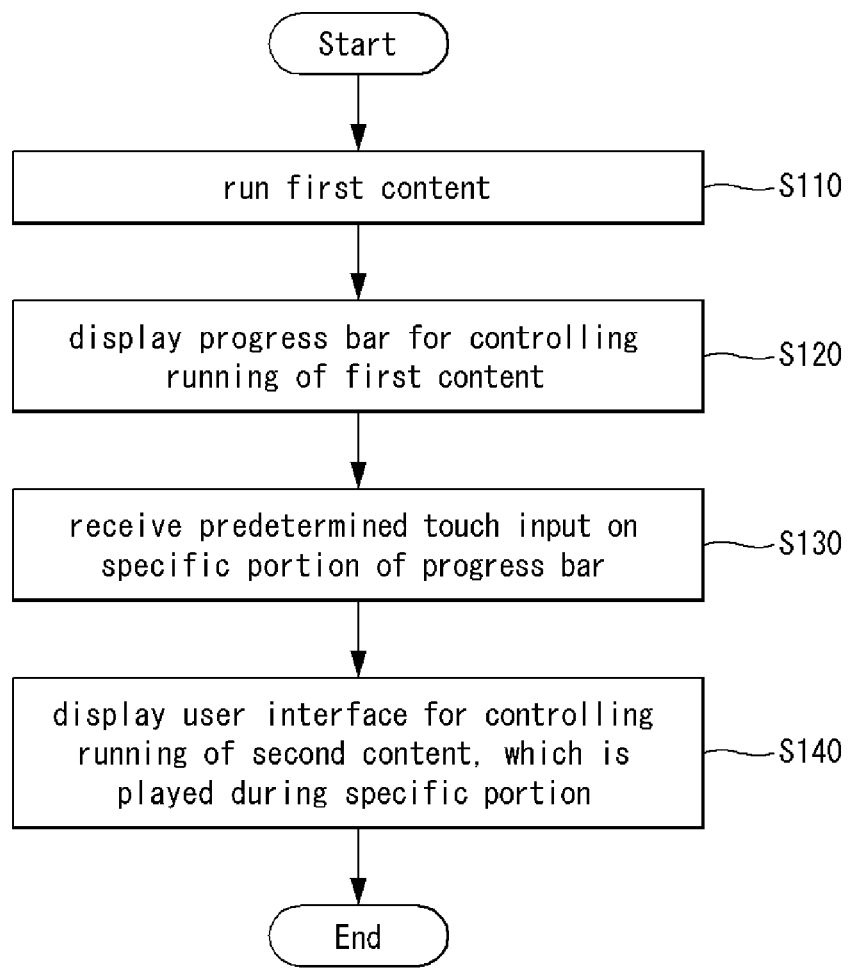
FIG. 2 is a flowchart for explaining the overall operation of the mobile terminal according to embodiments of this invention.

FIG. 2 is a flowchart for explaining the overall operation of the mobile terminal according to embodiments of this invention.

A method for controlling the mobile terminal can be implemented in the mobile terminal 100 explained with reference to FIG. 1.

According to embodiments of this invention, the controller 180 of the mobile terminal 100 runs first content (S100).

The first content is time-based content such as video, a still image, a music file, etc., and may include any content whose running can be controlled by a predetermined progress bar. The controller 180 can display the first content through the touch screen 151.

The controller 180 can display the progress bar for controlling running of the first content on the touch screen 151 (S120).

The progress bar may include a playing head or handler button which has information about the playback time of content and indicates the current playback position of the content. A graphical user interface (GUI) of the progress bar will be described in detail with reference to the drawings to be described later.

The controller 180 can receive a predetermined touch input on a specific portion of the progress bar (S130).

The first content is time-based content, and the progress bar takes the form of a bar which has a playback portion between the start and end points of playback of the first content.

The progress bar may be in other shapes than the bar-shape. For example, the playback of content can be controlled by a jog shuttle-like control item capable of controlling a content playback portion. Hereinafter, a description will be made on the assumption that the graphical user interface (GUI) for controlling the playback of content in the embodiments of the present invention is a bar-shaped progress bar.

Also, the predetermined touch input may include a touch input for selecting two points designating the specific portion and a drag input for increasing the distance between the selected two points.

The touch input on two points designating a specific portion of the progress bar may be multi-touch inputs by which a touch on a first point of the progress bar and a touch on a second point of the progress bar are simultaneously received.

As the multi-touch inputs are received, the controller 180 can specify a portion between the two touch points.

Thereafter, the controller 180 can receive an input by which the touch input for selecting the two touch points is dragged in a predetermined direction.

The predetermined direction may indicate the same direction in which the two touch points are dragged. The same direction may indicate an upward or downward direction in which a drag input on the progress bar is received. In this case, the length of the portion between the two touch points may not be changed.

The predetermined direction may indicate opposite directions in which the two touch points are dragged. Thus, the length of the portion between the two touch points may be decreased or increased.

The controller 180 can display on the touch screen 151 a user interface for controlling running of second content, which is played between two touch points (S140).

The second content may be content which is played during a part of the playback portion of the first content.

Hereinafter, it will be found out through embodiments that the user interface implemented on the touch screen 151 according to the control method of the second content having the playback portion between the two touch points can be modified in various ways.

Figure 3:
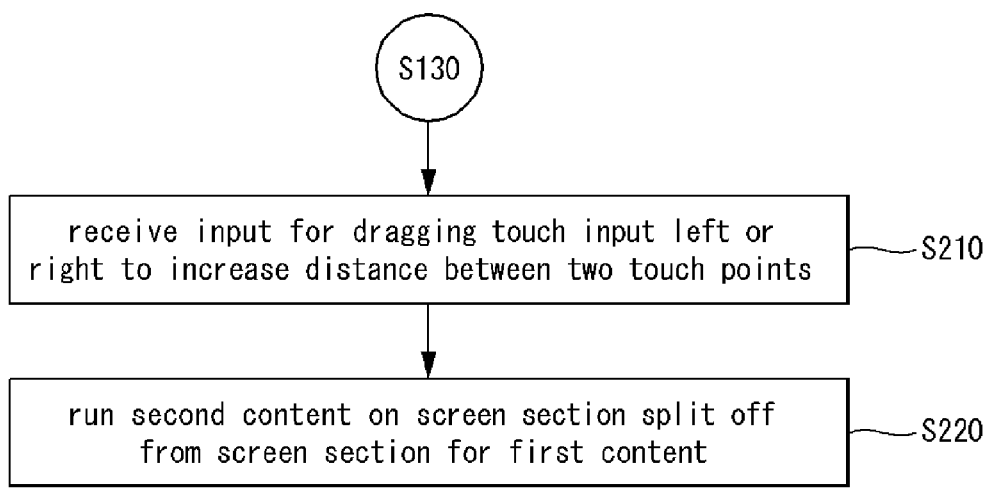
FIG. 3 is a flowchart for explaining a method for controlling a mobile terminal according to a first embodiment of the present invention.

FIG. 3 is a flowchart for explaining a method for controlling a mobile terminal according to a first embodiment of the present invention. FIGS. 4 to 7 are views for explaining the method for controlling a mobile terminal according to the first embodiment of the present invention.

The above control method may be implemented in the mobile terminal 100 explained with reference to FIG. 1. Hereinafter, the operation of the mobile terminal according to the first embodiment of the present invention will be described with reference to necessary drawings.

Referring to FIG. 3, after receiving a touch input at two points designating a specific portion of the progress bar, the controller 180 may receive an input for dragging the touch input left or right to increase the distance between the two touch points (S210).

The drag input may be performed on the progress bar.

Accordingly, the controller 180 can play the second content having the playback portion between the two touch points on a screen section split off from the screen section for the first content (S220).

The second content may be stored and played as separate content which is played between the two touch points out of the entire playback portion of the first content. That is, the second content may be a part of the first content.

Figure 4:
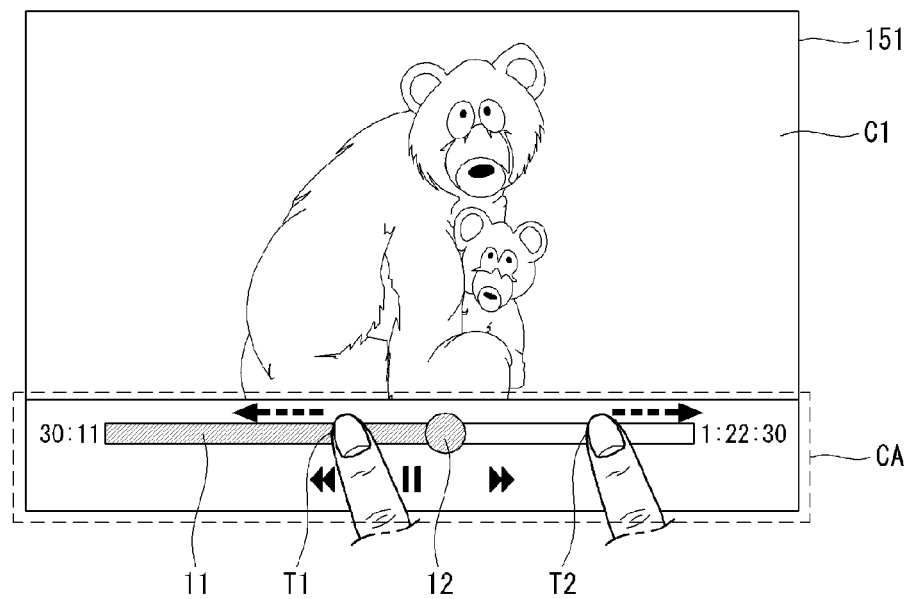
FIGS. 4 to 7 are views for explaining the method for controlling a mobile terminal according to the first embodiment of the present invention.

FIG. 4 is a view for explaining the step S210 of FIG. 3.

Referring to FIG. 4, the first content C1 can be displayed and played on the touch screen 151. The controller 180 can control the playback of the first content C1 and display the progress bar 11 including the playback time information of the first content C1 on the touch screen 151. Upon receipt of a predetermined touch input on the touch screen 151 on which the first content C1 is being played, the controller 180 can display the progress bar 11 on the touch screen 151.

A playing head 12 or handler 12 indicating the playback position of the first content C1 can be displayed on the progress bar 11. The left side and the right side are visually separated relative to the playing head 12. The colors of the left and right sides can be displayed differently relative to the playing head 151.

For example, the left side of the playing head 12 is displayed in black, and indicates the length of content played up to the current position. Also, the right side of the playing head 12 is displayed in white, and indicates the length of content to be played afterwards.

Moreover, the entire length of the progress bar 11 may correspond to the total playback length of content, and the total playback time may be displayed on the progress bar 11.

The progress bar 11 may be included in a control area CA for controlling running of the first content C1.

The controller 180 can detect a touch input at the two points T1 and T2 on the progress bar 11 and receive a drag input for moving the first touch point T1 to the left and a drag input for moving the second touch point T2 to the right. The drag inputs of the first touch point T1 and the second touch point T2 may be simultaneously received.

Figure 5:
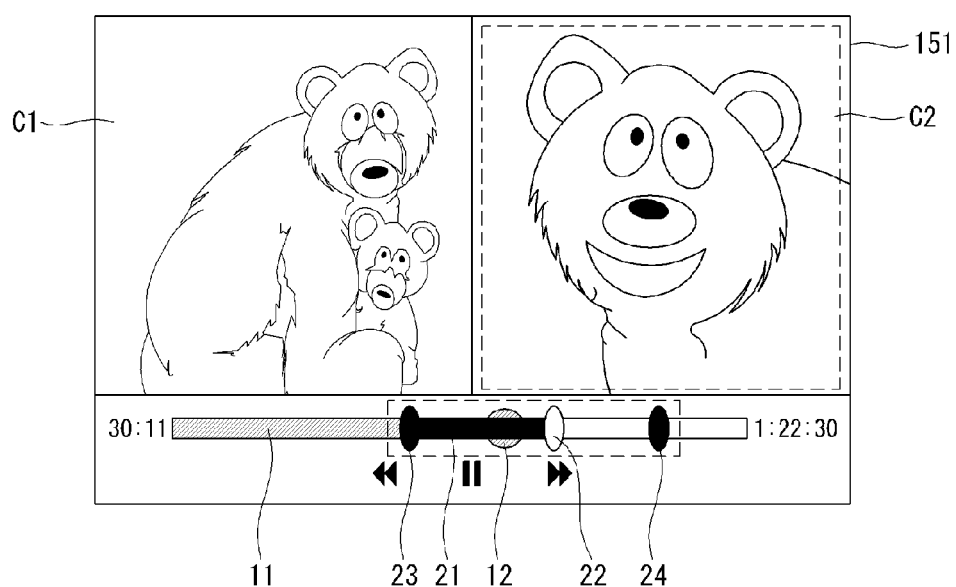

FIG. 5 is a view for explaining the step S220 of FIG. 3.

Referring to FIG. 5, upon receipt of a drag input for moving the two points (T1 and T2 of FIG. 4) on the progress bar 11 away to the left and right during the playback of the first content C1, the second content C2 whose playback starts at the first touch point T1 and ends at the second touch point T2 may be displayed on a screen section split off from the screen section for the first content C1.

Although not shown, upon receipt of a drag input by which the two touch points 23 and 24 are dragged in opposite directions in a way of decreasing the distance between the two touch points, the controller 180 may combine the split screen sections together into one screen for display. For example, upon receipt of a drag input for moving the first touch point 23 to the right and the second touch point 24 to the left, the controller 180 may perform control such that the first content C1 is displayed on the entire area of the touch screen 151. In this case, the second content C2 may be removed from the touch screen 151.

Meanwhile, referring to FIG. 5, a sub progress bar 21 for controlling the playback of the second content C2 may be displayed on the touch screen 151, corresponding to the main progress bar 11 for controlling the playback of the first content C1. Moreover, the sub progress bar 21 may further include a playing head 22.

Accordingly, apart from the playback of the first content C1, the playback of the second content C2 can be controlled by controlling the movement of the playing head 22 of the sub progress bar 21.

The first content C1 is controlled by means of the progress bar 11, and the second content C2 is controlled by means of the sub progress bar 21. The progress bar 11 includes the playing head 12 which indicates the current playback position of the first content C1, and the sub progress bar 21 includes the playing head 22 which indicates the current playback position of the second content C.

Moreover, the progress bar 11 and the sub progress bar 21 may be displayed overlapping each other, as shown in FIG. 5. Even if the progress bar 11 and the sub progress bar 21 overlap each other, they can be displayed in such a manner that the start and end points of the playback of the second content C2 are identified.

Accordingly, the controller 180 can play either the first content C1 or the second content C2 through the touch screen 151 according to the relative positions of the first playing head 12 and second playing head 22.

Figure 6:
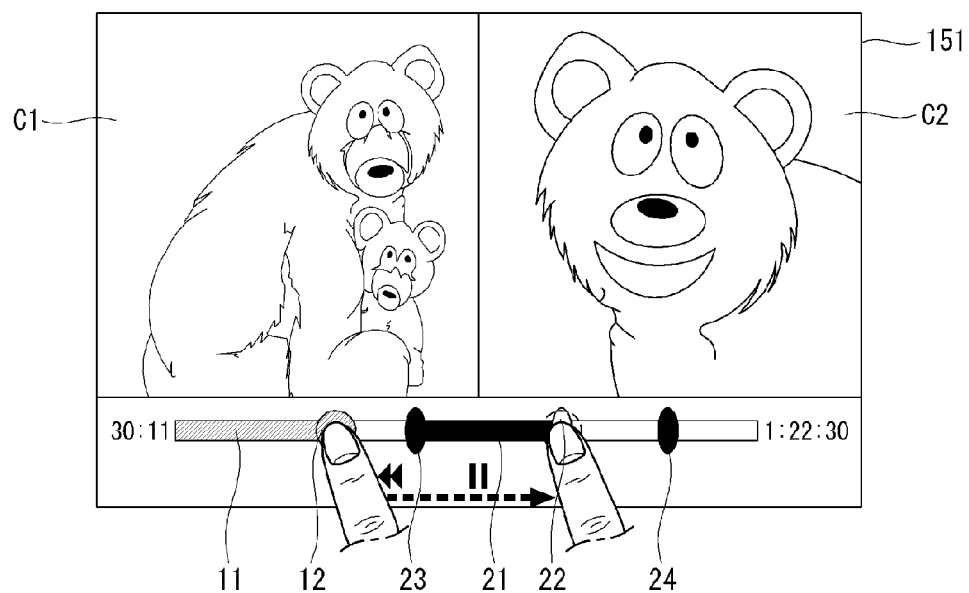

For example, referring to FIG. 6, upon receipt of a drag input for moving the first playing head 12 to the second playing head 22, the controller 180 can play a frame corresponding to the position of the second playing head 22 out of the first content C1. It is assumed that the second content C2 is a part of the first content C1.

Figure 7:
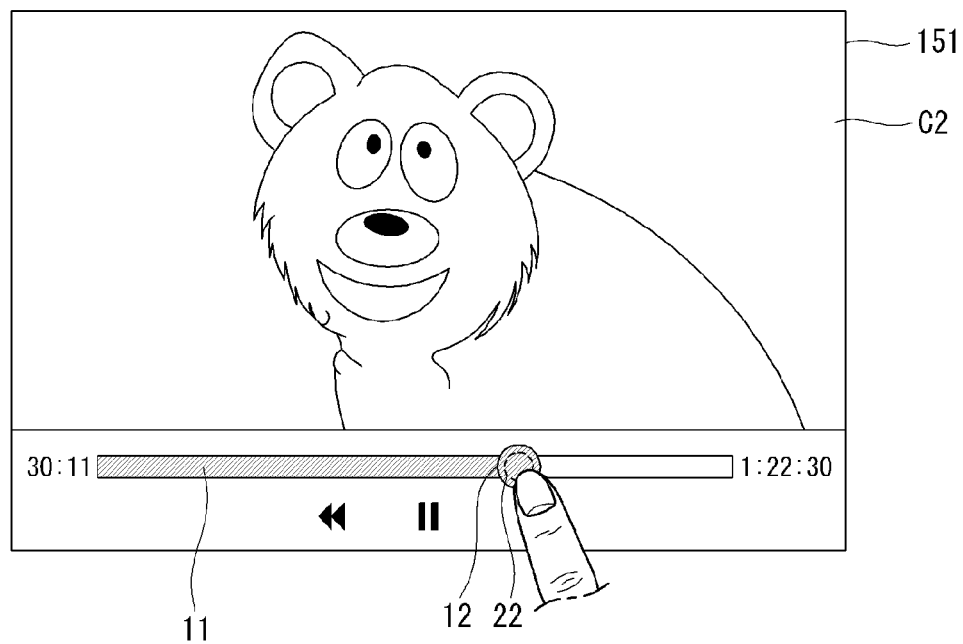

Referring to FIG. 7, if the positions of the first playing head 12 and second playing head 22 are consistent with each other while the first content C1 and the second content C2 are being played on different split screens, the controller 180 can play only the first content C1, but not the second content C2. That is, if the positions of the playing heads are consistent, the split screen mode is terminated.

If the playback positions of the two contents are equal, an image displayed in the first content C1 area and an image displayed in the second content C2 area are identical, because the second content C2 corresponds to a part of the playback portion of the first content C1.

As stated above, however, the first content C1 and the second content C2 may be separately played even when the playback position of the first playing head 12 and the playback position of the second playing head 22 are consistent.

For example, if the second content C2, though corresponding to a part of the playback portion of the first content C1, is stored separately in the memory (160 of FIG. 1), the first content C1 and the second content C2 can be separately played on different split screen sections, regardless of the relative positions of the first playing head 12 and second playing head 22, even when the positions of the playing heads are consistent.

Figure 8:
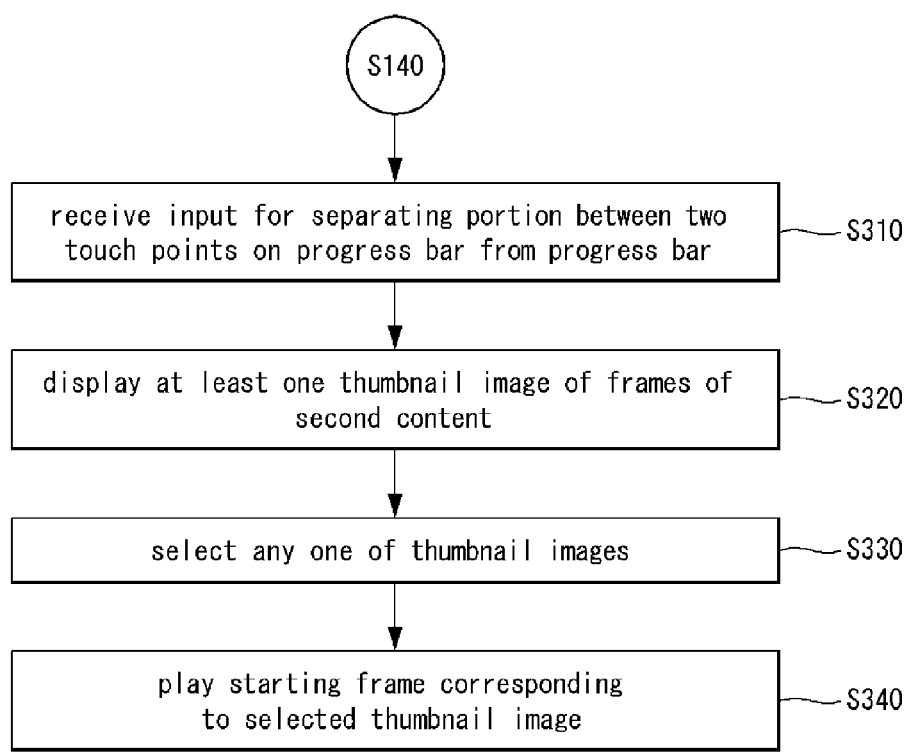
FIG. 8 is a flowchart for explaining a method for controlling a mobile terminal according to a second embodiment of the present invention.

FIG. 8 is a flowchart for explaining a method for controlling a mobile terminal according to a second embodiment of the present invention. FIGS. 9 to 13 are views for explaining the method for controlling a mobile terminal according to the second embodiment of the present invention.

Referring to FIG. 8, the drag input in a predetermined direction received for the two touch inputs on the progress bar in the step S140 of FIG. 2 may be various.

For example, the controller 180 can receive an input for separating the portion between the two touch points on the progress bar from the progress bar (S310).

Then, the controller 180 can present frames corresponding to the portion between the two touch points as at least one thumbnail image and display them on the touch screen 151 (S320).

The number of thumbnail images may be determined in advance. The thumbnail image may be at least one thumbnail image for a representative image of the frames corresponding to the portion between the two touch points.

Although not shown, upon receipt of a touch input on the thumbnail image, the controller 180 can display on the touch screen 151 thumbnail images of all the frames corresponding to the playback portion.

Upon receipt of an input for selecting any one of the thumbnail images (S330), the controller 180 can play, starting from the frame corresponding to the selected thumbnail image (S340).

Figure 9:
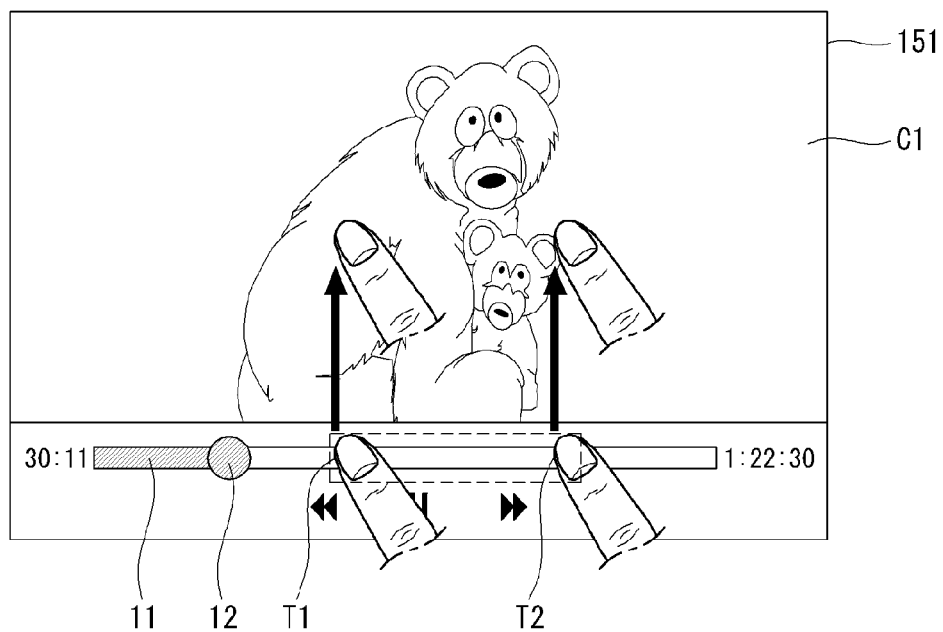
FIGS. 9 to 13 are views for explaining the method for controlling a mobile terminal according to the second embodiment of the present invention.

FIG. 9 is a view for explaining the step S310 of FIG. 8.

Referring to FIG. 9, while the first content C1 is being displayed and played on the touch screen 151, a touch input for selecting the two points T1 and T2 to designate a specific portion of the progress bar 11 can be received, and a drag input for moving the touch input upwards can be received.

Figure 10:
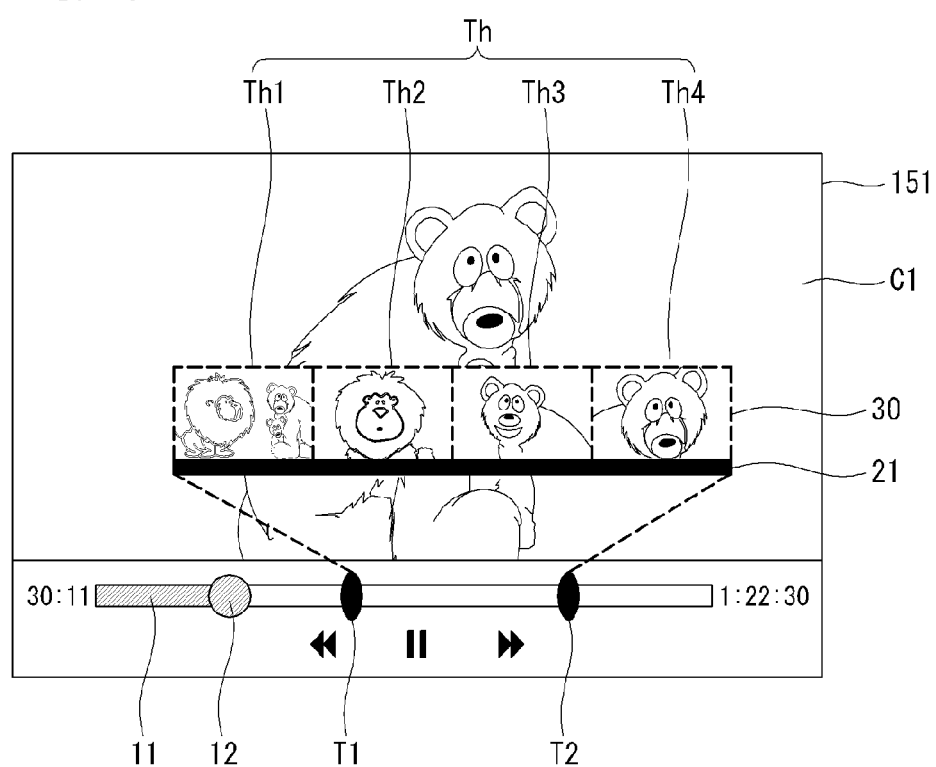

Referring to FIG. 10, upon receipt of a drag input for selecting the two points T1 and T2 and separating the portion between the two points T1 and T2 from the progress bar, the controller 180 can display on the touch screen 151 thumbnail images 30 of the second content having the playback portion between the two touch points T1 and T2.

Along with the thumbnail images 30, the controller 180 can display on the touch screen 151 the sub progress bar 21 for controlling the playback of the frames corresponding to the thumbnail images.

The controller 180 can display the thumbnail images 30 in the vicinity of the progress bar 11.

To identify the start and end points of the playback of the frames corresponding to the thumbnail images 30 as the two touch points T1 and T2, respectively, the controller 180 can show that the first touch point T1 corresponds to the first thumbnail image and the second touch point T2 corresponds to the last thumbnail image.

Figure 11A:
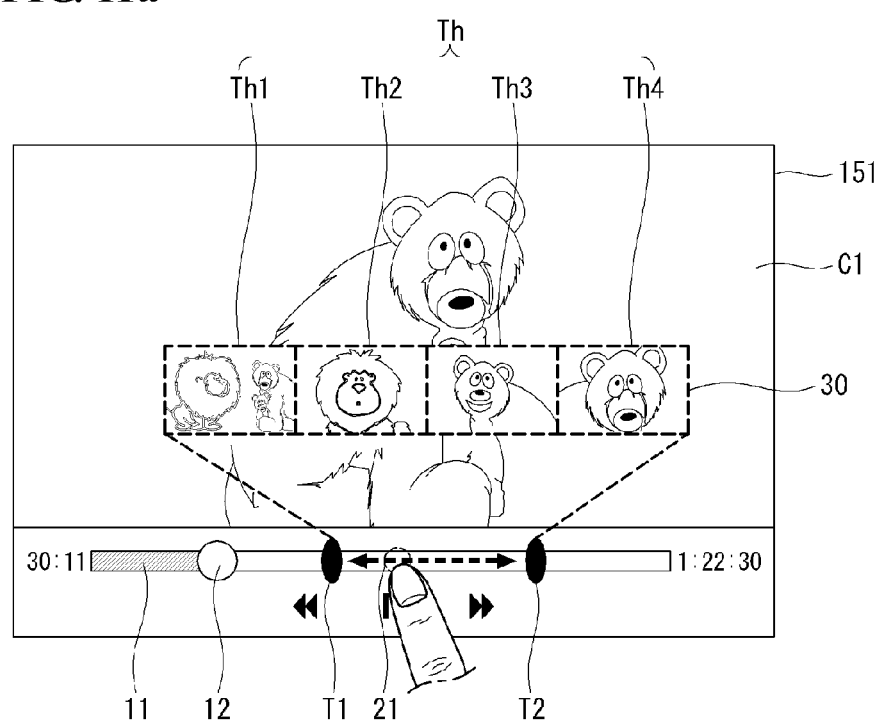

Referring to FIG. 11a, the controller 180 of the mobile terminal 100 can display a sub playing head 21, which is capable of controlling the running of the thumbnail images for a specific portion (T1~T2) displayed on the touch screen 151, along with the main progress bar 11.

Accordingly, the sub playing header 21 is movable on the main progress bar 11, and the controller 180 can highlight a specific thumbnail Th2 corresponding to the position of the sub playing head 21 and display it on the touch screen 151, along with the movement of the sub playing header 21.

Figure 11B:
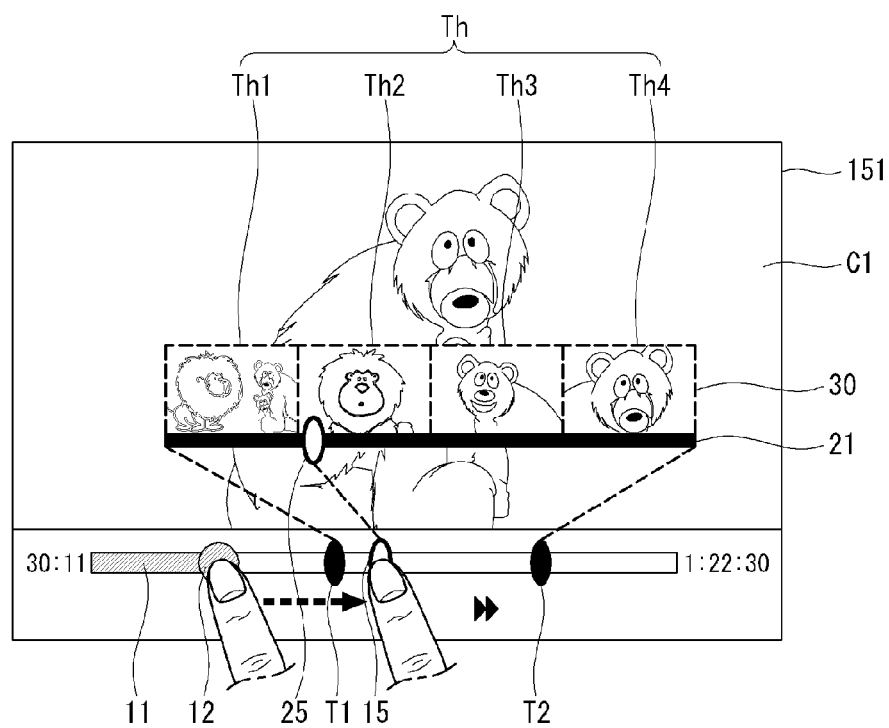

Referring to FIG. 11b, the controller 180 of the mobile terminal 100 can display on the touch screen 151 the sub progress bar 21 for controlling the playback of the frames corresponding to the thumbnail images 30, along with the thumbnail images 30 shown in FIG. 11a.

Upon receipt of an input for dragging the playing head 12 of the progress bar 11 and moving it to a specific point between the two touch points T1 and T2, the controller 180 can display a position identifier 25 on the sub progress bar 21 corresponding to the specific point 15 of the sub progress bar 21 in order to identify a thumbnail image Th2 corresponding to the specific point 15.

Figure 12:
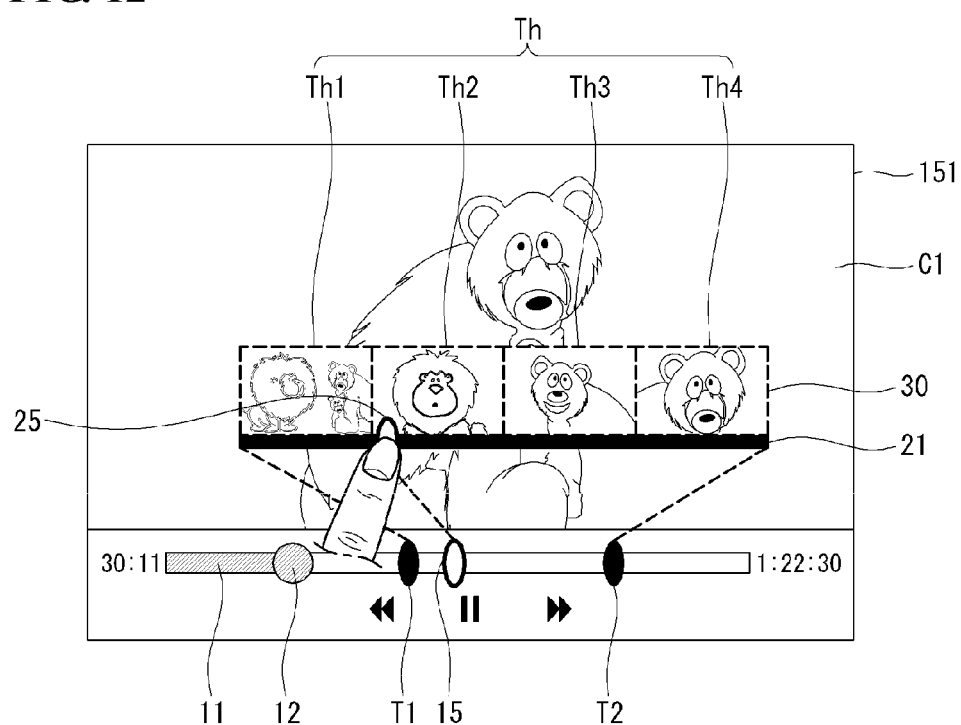

On the contrary, referring to FIG. 12, upon receipt of a touch input on a specific point 25 of the sub progress bar 21, a position on the specific point of the sub progress bar 21 can be displayed at the specific point 15 of the progress bar 11.

Moreover, the controller 180 can change the display characteristics of the progress bar 11 so as to identify the point 15 corresponding to the sub progress bar 21 out of the timeline of the progress bar 11.

Figure 13:
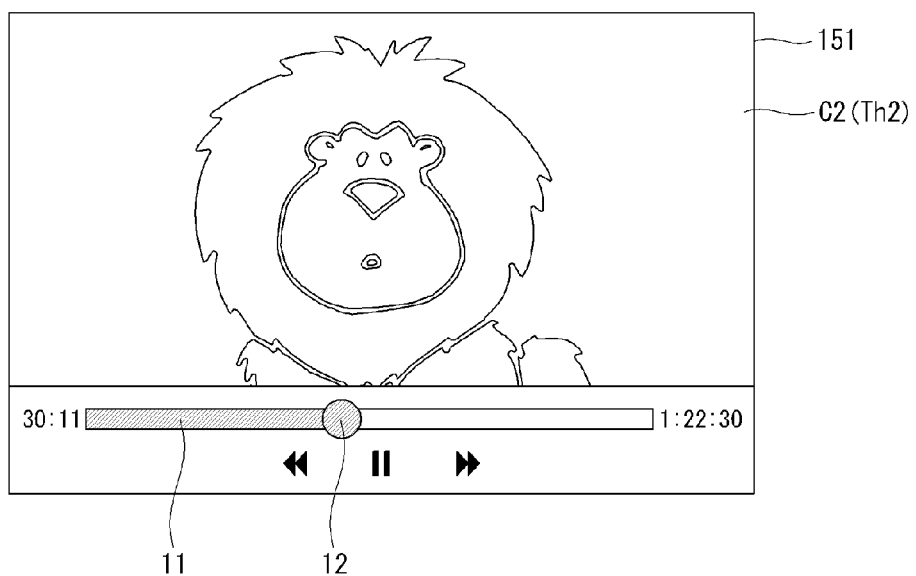

Referring to FIG. 13, when any one of a plurality of thumbnail images is selected, the controller 180 can immediately play the second content C2 corresponding to the selected thumbnail image Th2. Meanwhile, the playing head 12 indicating the current playback position of the selected thumbnail image Th2 can be displayed on the progress bar 11.

The foregoing description has been made with respect to an example of displaying thumbnail images of content which is played between two touch points input on the progress bar.

The following description will be made with respect to an example where a plurality of multi-touches are input on the progress bar, thumbnail images presented on the touch screen are therefore plural, a plurality of thumbnail image sets are saved, and the saved thumbnail image sets are presented.

[Embodiment 3]

Figure 14:
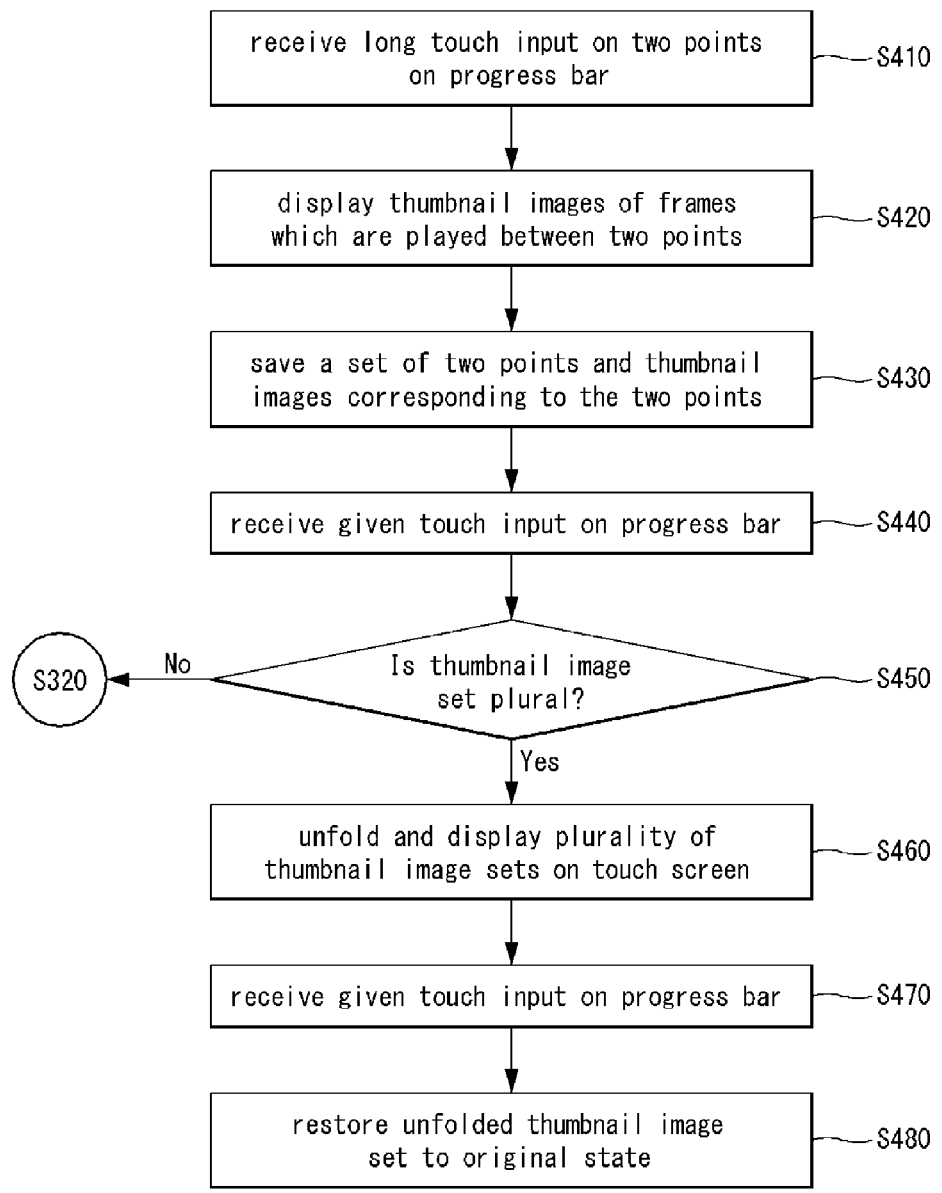
FIG. 14 is a flowchart for explaining a method for controlling a mobile terminal according to a third embodiment of the present invention.

FIG. 14 is a flowchart for explaining a method for controlling a mobile terminal according to a third embodiment of the present invention. FIGS. 15 to 18 are views for explaining the method for controlling a mobile terminal according to the third embodiment of the present invention.

The above control method can be implemented in the mobile terminal 100 explained with reference to FIG. 1. Hereinafter, the operation of the mobile terminal according to the third embodiment of the present invention will be described with reference to necessary drawings.

Referring to FIG. 14, the controller 180 can receive a long touch input on two points on the progress bar (S410).

The controller 180 can display on the touch screen 151 thumbnail images of frames which are played between the two touch points on the progress bar (S420).

Thereafter, the controller 180 can save a set of the two touch points of the progress bar and thumbnail images corresponding to the two touch points in the memory (160 of FIG. 1) (S430).

The thumbnail image set saved in the memory 160 may be plural. For example, there may be a plurality of thumbnail image sets which have different playback portions. Also, for example, there may be a plurality of thumbnail image sets whose playback portions at least partially overlap each other.

Accordingly, if the controller 180 saves a thumbnail image belonging to a specific portion of the progress bar for controlling the playback of the first content while playing the first content, it can display an identification mark on the touch screen 151 to notify the user that a certain thumbnail image has been saved. For example, if a thumbnail image set is saved, the progress bar can be given a stereoscopic effect when displayed.

With the at least one thumbnail image set being saved, a given touch input can be received on the progress bar (S440).

In this case, the controller 180 can detect whether the thumbnail image set configured and saved by a touch operation on the progress bar is plural or not (S450).

If there are a plurality of thumbnail image sets, the controller 180 can unfold and display the plurality of thumbnail image sets on the touch screen 151 (S460).

For example, the controller 180 may unfold and display at least one saved thumbnail image above the progress bar. The thumbnail image set may include at least one thumbnail image corresponding to a given portion and a sub progress bar for controlling running of content corresponding to the thumbnail image. As the thumbnail image is displayed on the touch screen 151, the start and end points of the playback of the content corresponding to the thumbnail image can be displayed on the progress bar.

If a given touch input is received on the progress bar, with all of the plurality of thumbnail images presented on the touch screen 151 (S470), the unfolded thumbnail image set can be restored to the original state (S480).

The touch input for restoring the thumbnail image set unfolded on the touch screen 151 to the original state may be a touch input for dragging the unfolded thumbnail image set to a position on the progress bar.

Figure 15:
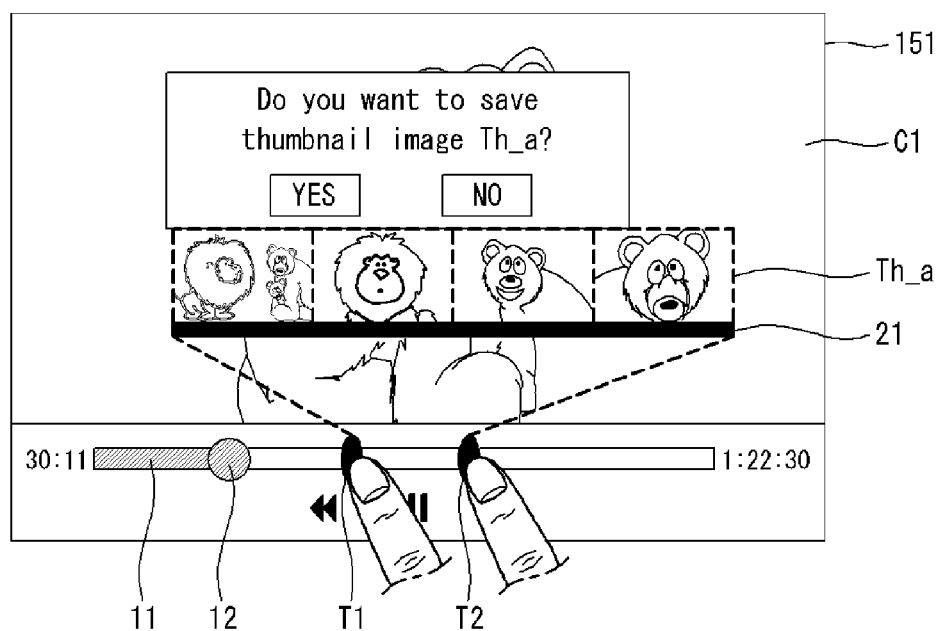
FIGS. 15 to 18 are views for explaining the method for controlling a mobile terminal according to the third embodiment of the present invention.
Figure 16:
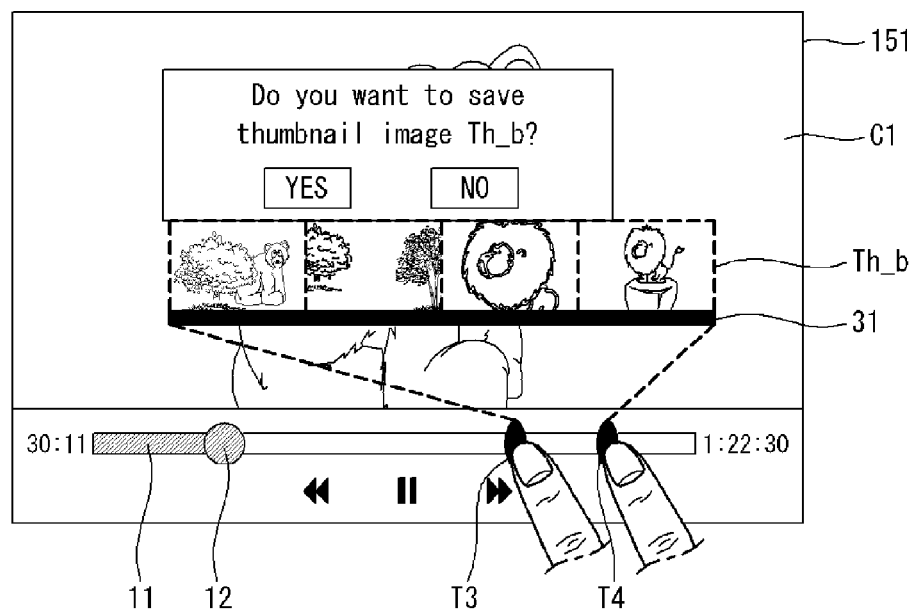

FIGS. 15 and 16 are views for explaining the step S430 of FIG. 14.

Referring to FIG. 15, two points T1 and T2 on the progress bar 11 for controlling the playback of the first content C1 can be selected while the first content C1 is being played through the touch screen 151.

Upon receipt of a touch input for selecting the two touch points T1 and T2, the controller 180 can display on the touch screen 151 at least one thumbnail image Th_a corresponding to frames which are played between the two touch points T1 and T2, out of the first content C1.

Also, the thumbnail image Th_a and the two touch points T1 and T2 can be matched to each other and saved as a set.

Referring to FIG. 16, a thumbnail image Th_b for two touch points different from the two touch points T1 and T2 of FIG. 15 can be likewise saved.

Figure 17:
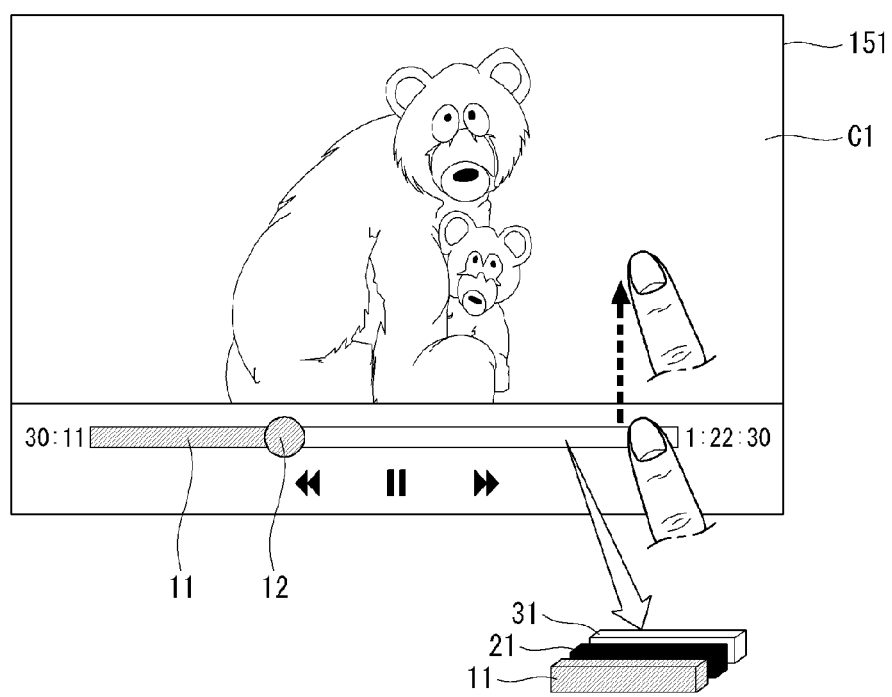
Figure 18:
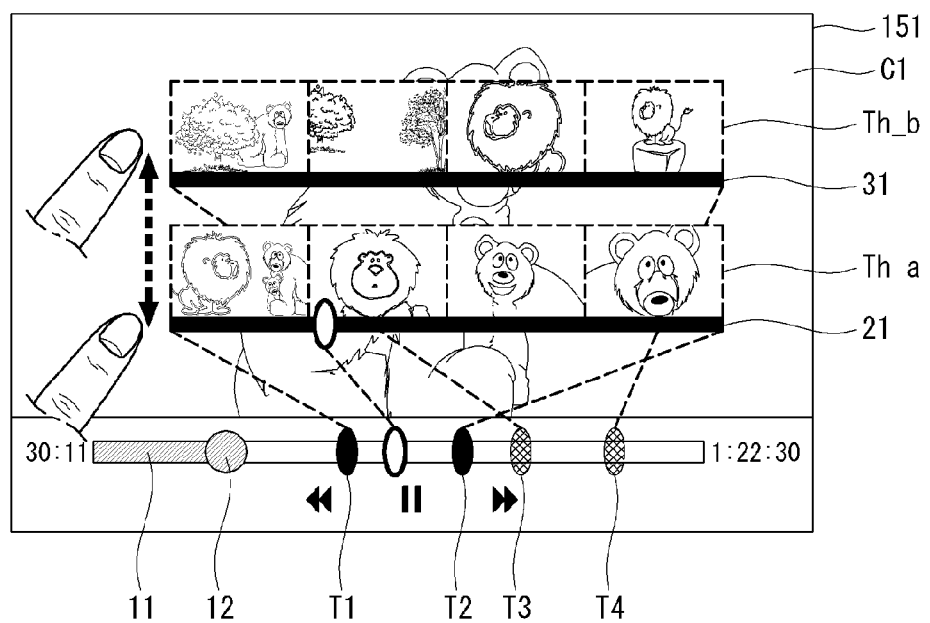

Referring to FIG. 17, upon receipt of a drag input for lifting one end of the progress bar upwards after a thumbnail image corresponding to a specific portion of the progress bar (see FIGS. 15 and 16), a plurality of thumbnail image sets Th_a-21 and Th_b-31 configured and saved by means of the progress bar can be displayed on the touch screen 151, as shown in FIG. 18.

Also, the controller 180 can display on the progress bar 11 the start point (T1 for Th_a and T3 for Th_b) of the playback of the content corresponding to each thumbnail image set and the end point (T2 for Th_a and T4 for Th_b) of the playback thereof.

Subsequently, referring to FIG. 18, upon receipt of a drag input for moving the plurality of thumbnail image sets Th_a-21 and Th_b-31 toward the progress bar 11, with the plurality of thumbnail image sets Th_a-21 and Th_b-31 being unfolded on the touch screen 151, the plurality of thumbnail image sets Th_a-21 and Th_b-31 can be removed from the touch screen 151.

Meanwhile, upon receipt of an input for selecting a specific thumbnail image, with the plurality of thumbnail image sets Th_a-21 and Th_b-31 being displayed on the touch screen 151, the controller 180 can control such that playing starts from a frame corresponding to the selected thumbnail image.

According to the above-described method for controlling a mobile terminal according to an embodiment of the present invention, it is possible to provide a representative image for a user-desired portion by multi-touch inputs on two points received on the progress bar, and to save a thumbnail image set corresponding to that portion.

Figure 19:
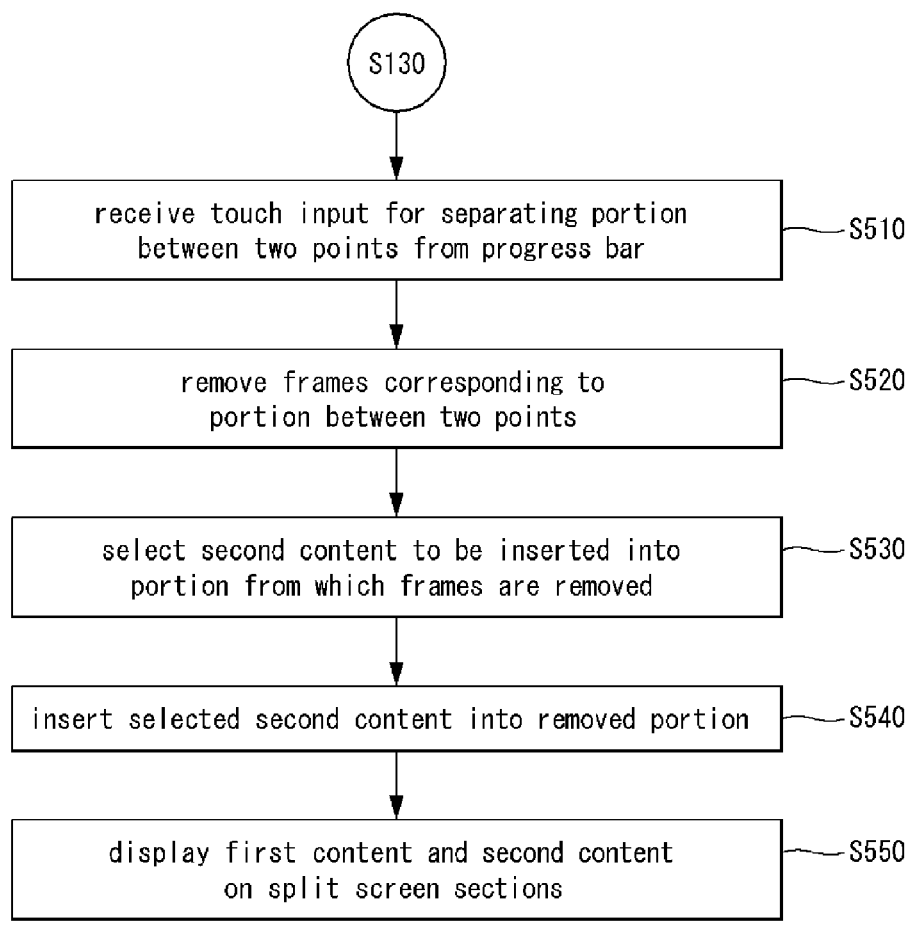
FIG. 19 is a flowchart for explaining a method for controlling a mobile terminal according to a fourth embodiment of the present invention.

FIG. 19 is a flowchart for explaining a method for controlling a mobile terminal according to a fourth embodiment of the present invention. FIGS. 20 to 29b are views for explaining the method for controlling a mobile terminal according to the fourth embodiment of the present invention.

The above control method can be implemented in the mobile terminal 100 explained with reference to FIG. 1. Hereinafter, the operation of the mobile terminal according to the fourth embodiment of the present invention will be described with reference to necessary drawings.

According to an embodiment of the present invention, upon receipt of a drag input for moving a touch input on two points on the progress bar in a given direction, frames corresponding to the portion between the two points can be removed, but instead other content can be inserted into the portion from which the frames are removed.

The touch input for separation may include an input to drag the touch input for selecting the two touch points vertically above or below the progress bar.

The controller 180 can receive a touch input for separating a portion between two points on the progress bar from the progress bar (S510).

The touch input may include a drag input for moving the two points vertically above or below the progress bar.

In response to the touch input, the controller 180 can remove all the frames corresponding to the portion between the two points (S520).

The controller 180 can select second content to be inserted into the portion from which the frames are removed (S530).

The controller 180 inserts the selected second content into the removed portion (S540), and displays the first content and the second content on split screen sections (S550).

Hereinafter, the embodiment shown in FIG. 19 will be described in more detail with reference to FIGS. 20 to 29b.

Referring to FIG. 29, the mobile terminal 100 can play the first content C1 in landscape mode. If the body of the mobile terminal 100 is rotated at 90 degrees in the landscape mode, the controller 180 can switch the mode of the mobile terminal 100 from landscape mode to portrait mode, and display the first content C1 in a specific area of the touch screen 151. The specific area is an area where the first content C1 is optimized and viewed in the portrait mode.

The controller 180 can receive two touch inputs T1 and T2 for designating a specific portion 41 of the progress bar 11 and then a drag input for moving the touch inputs below the progress bar 11. The drag input can separate the specific portion 41 from the progress bar 11 and remove the frames corresponding to the specific portion 41 from the first content C1.

Content different from the first content C1 can be inserted into the removed portion. The inserted content may be time-based content. Accordingly, the content to be inserted into the specific portion 41 may be played within the specific portion 41.

However, the present invention is not limited to the foregoing. For example, the inserted content may not be time-based content. For example, the inserted content may include a still image, an execution screen of an application, etc.

Figure 21:
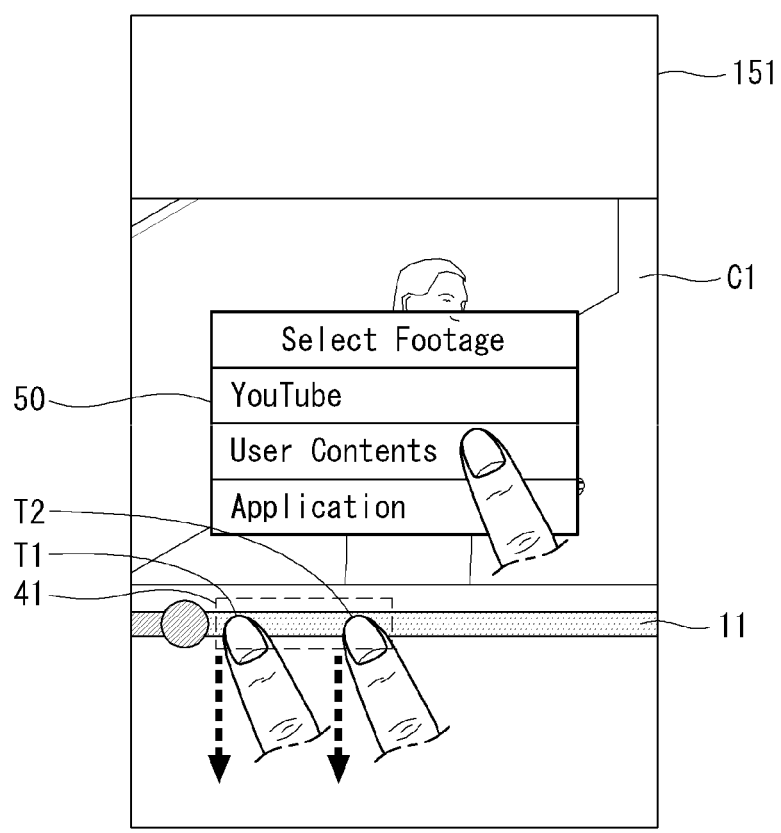

Referring to FIG. 21, upon receipt of the drag input, the controller 180 can display a user interface 50 for selecting content to be inserted into the specific portion 41 on the touch screen 151. The user interface may include a pop-up menu window 50.

The content to be inserted may be content that is obtained by connecting to the internet or that is stored in the memory 160. Moreover, the content to be inserted may include at least one application executable on the mobile terminal 100.

The content obtainable by connecting to the internet may include a YouTube video. The content stored in the memory 160 may include a still image, a video, etc. produced by a user. In addition, the at least one application executable on the mobile terminal 100 may include memo, map, calendar, game, camera applications, etc.

The pop-up menu window 50 shown in FIG. 21 is merely illustrative, and the scope of the present invention is not limited thereto. For example, upon receipt of a drag input for dragging a touch input on two points designating a specific portion of the progress bar 11 downward, the controller 180 can present the user with at least one content list (not shown) that can be inserted into the specific portion, out of the second content associated with the first content.

For example, upon receipt of the drag input, the controller 180 can also control the second content associated with the first content to be automatically inserted.

Accordingly, the first content C1 and the inserted second content C2 can run on split different sections of the touch screen 151.

Figure 22:
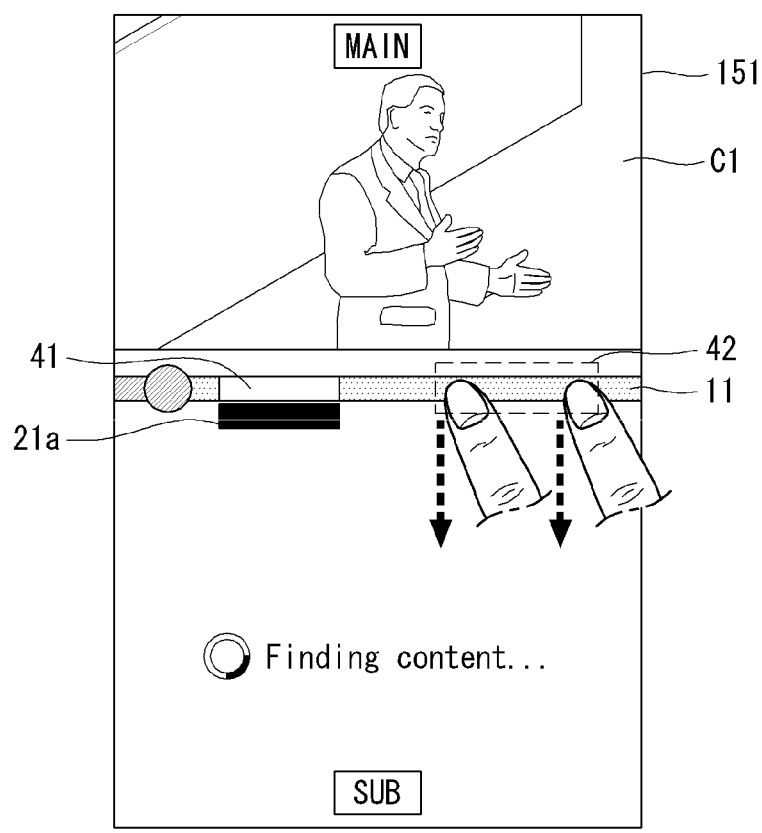

Referring to FIG. 22, when predetermined content is inserted into a first specific portion 41 of the progress bar 11, a first sub progress bar 21a for controlling the playback of the inserted content can be displayed on the touch screen 151. The first sub progress bar 21a can be displayed in the vicinity of the first specific portion 41.

Thereafter, upon receipt of a drag input for dragging a touch input for selecting a second specific portion 42 of the progress bar 11 downward, the controller 180 can perform the same process as the process of inserting predetermined content into the first specific portion 41.

Figure 23:
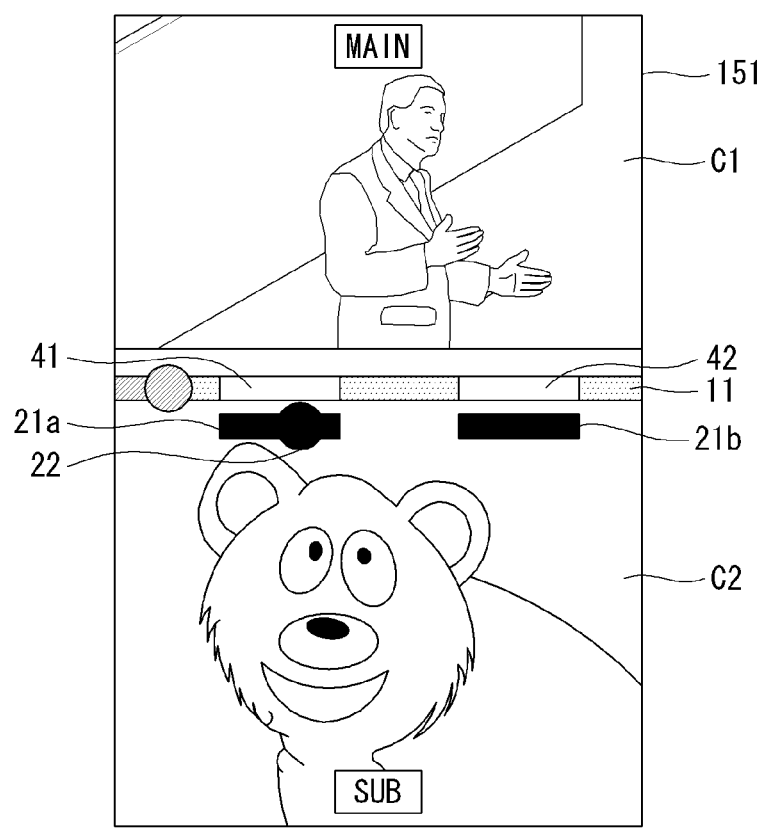

FIG. 23 is a view illustrating the process of running the first content and the second content after inserting the second content by editing the progress bar by means of a touch operation on the progress bar for controlling the playback of the first content.

Referring to FIG. 23, the first content C1 and the second content C2 can be simultaneously played on split screen sections.

The playback of the first content C1 may be controlled by the main progress bar 11, and the playback of the inserted second content C2 may be controlled by the first sub progress bar 21a and a second sub progress bar 21b.

Each of the progress bars 11, 21a, and 21b may display each of playing heads A, B, and C indicating the current playback positions of respective contents. The main progress bar 11 may be provided with the playing head A indicating the current playback position of the first content, the first sub progress bar 21a may be provided with the playing head B indicating the current playback position of the content inserted into the first specific portion 41, and the second sub progress bar 21b may be provided with the playing head C indicating the current playback position of the content inserted into a second specific portion 42.

FIG. 23 depicts an example of controlling the second content C2 inserted into the first specific portion 41 by the playing head B of the first sub progress bar 21a.

Figure 24:
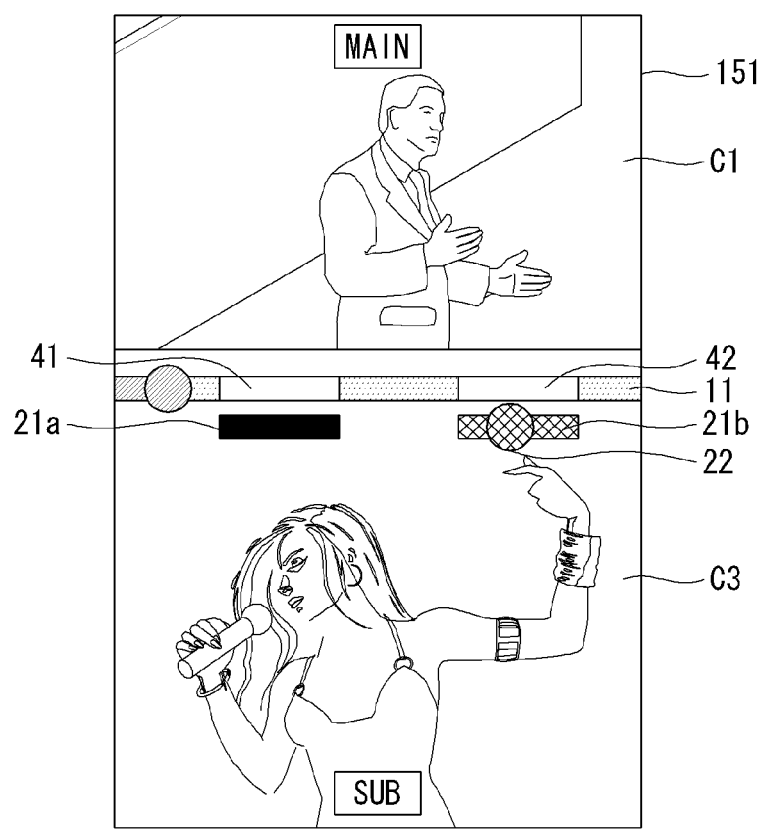

FIG. 24 depicts an example of controlling the third content C3 inserted into the second specific portion 42 by the playing head C of the second sub progress bar 21b.

The first content C1, the second content C2, and the third content C3 may have different playback portions within the same content. Moreover, these contents may be different types of content.

Figure 25:
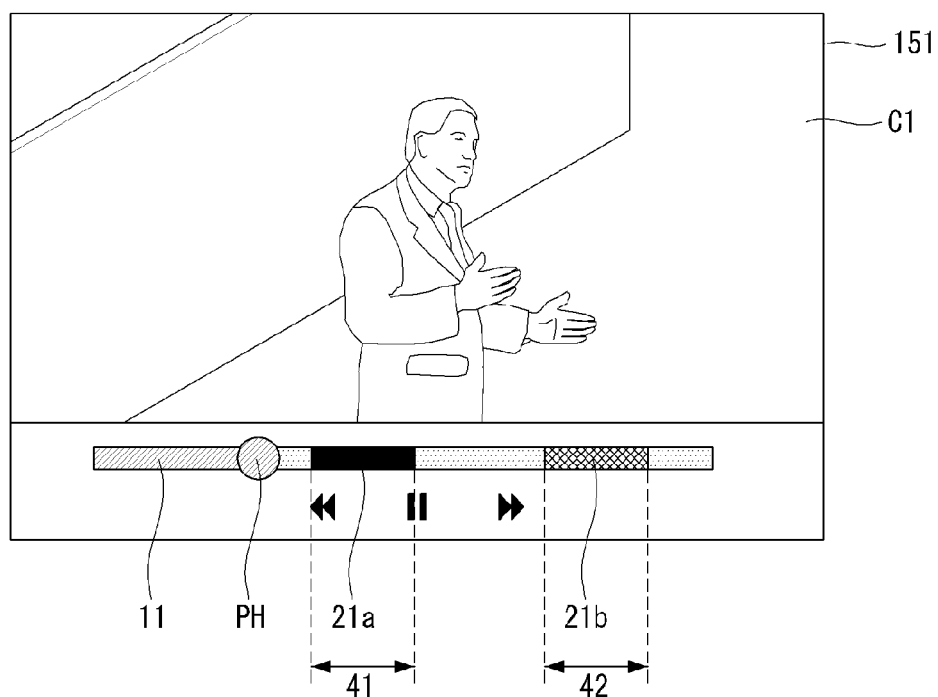

FIG. 25 depicts an example in which the first sub progress bar 21a and the second sub progress bar 21b are displayed, overlapping the main progress bar 11, in the examples explained in FIGS. 23 and 24; the display characteristic of the progress bars are made different so as to identify that predetermined contents are respectively inserted into the specific portions 41 and 42.

That is, the controller 180 can display the progress bars for the portions corresponding to the respective contents in different colors.

At this point, the content to be displayed on the touch screen 151 may be varied depending on the position of the playing head PH. For example, FIG. 25 shows that the playing head PH is present in the first content area.

Figure 26:
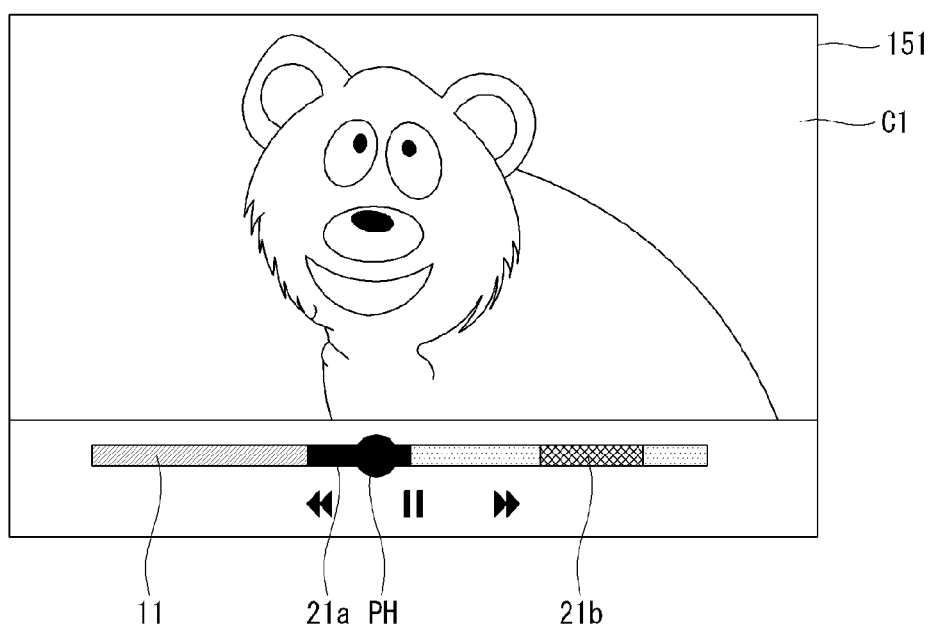

Referring to FIG. 26, the playing head PH is located in the second content area 21a. In this case, the controller 180 can control the second content to be played and displayed on the touch screen 151.

Figure 27:
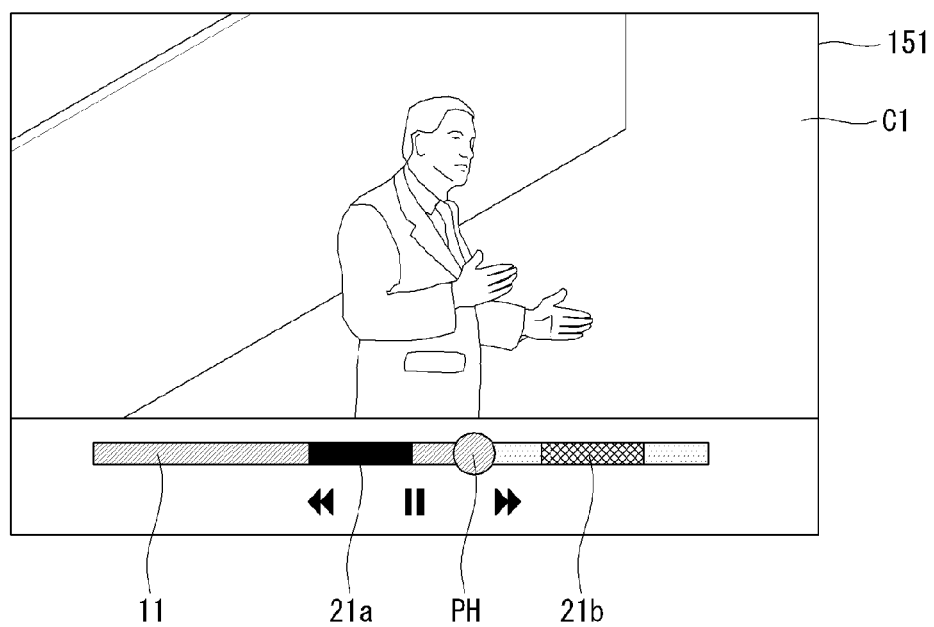

Referring to FIG. 27, if the playing head PH is relocated in the first content area with the passage of time, the controller 180 of the mobile terminal 100 can control the first content to be played and displayed on the touch screen 151.

The previous embodiments have been described with respect to the case where, if a specific portion of a progress bar is removed and second content is inserted during the playback of first content, the playback of both the first and second contents can be controlled by means of the only progress bar.

However, the method for controlling a mobile terminal according to the fourth embodiment of the present invention may involve not only removing a specific portion of a progress bar but also combining inserting other content into the specific portion.

Figure 28:
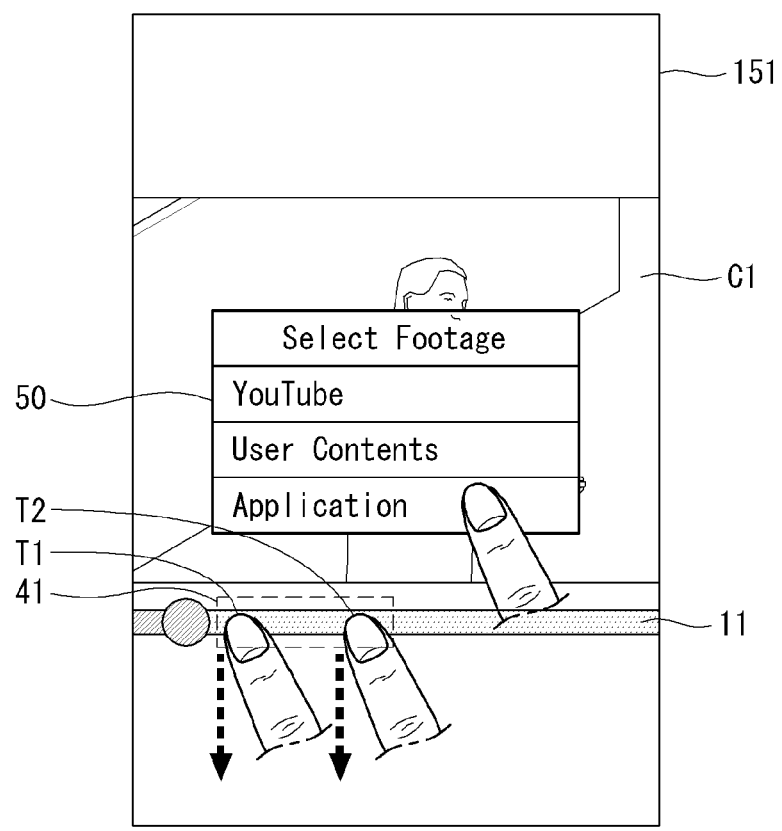

FIGS. 28 and 29 depict an embodiment in which a predetermined application is combined and inserted into a specific portion of a progress bar controlling running of specific content, and the running of the content and the inserted application are controlled by one progress bar.

Referring to FIG. 28, if a touch input for selecting two points T1 and T2 on a progress bar 11 is received during the playback of first content (video lecture) C1, and a predetermined drag input (downward drag input) for separating a specific portion 41 selected by the touch input from the progress bar 11, the controller 180 can display a pop-up menu window 50 on the touch screen 151.

An application item can be selected from the pop-up menu window 50. The following description will be made on the assumption that the application is a memo application.

Figure 29A:
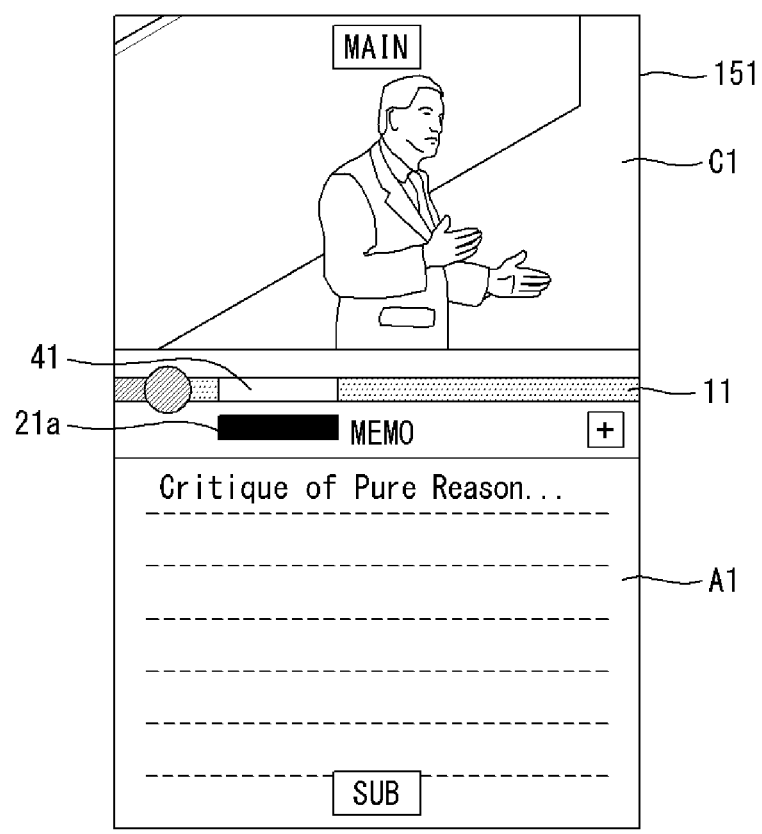

Referring to FIG. 29a, upon receipt of the touch input and the drag input during the playback of the first content (video lecture) C1, the memo application A1 can be run. The video lecture and the memo application can run on split sections of the touch screen 151.

If the user wants to take notes for a specific playback portion 21a during the playback of the video lecture C1, a memo can be inserted into the specific portion 21a of the progress bar by the touch input and the drag input on that portion 21a.

The memo to be inserted does not need to be associated with the video lecture C1 corresponding to that portion 21a. For example, if the user wants to rate the lecture for a specific portion by means of the memo application after a predetermined period of time after watching the video lecture C1 for the specific portion, the portion into which the memo is inserted may be inserted into a portion other than the specific portion.

Figure 29B:
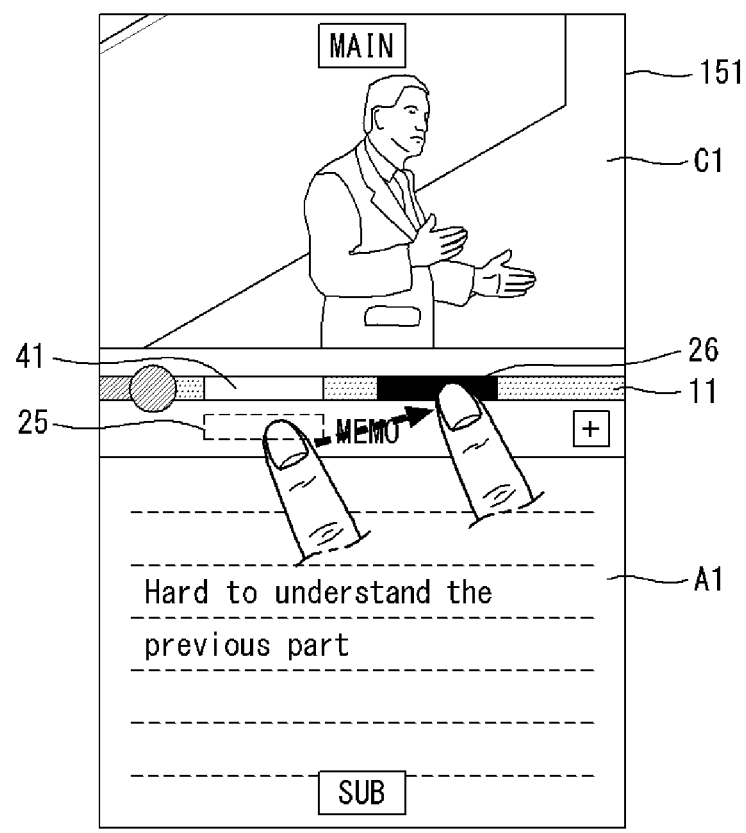

Referring to FIG. 29b, the memo inserted into the specific portion 21a of the progress bar 11 may be inserted into other portions of the progress bar 11 during the playback of the video lecture C1.

For example, upon receipt of a drag input for moving the sub progress bar 25 to a certain portion 26 of the progress bar 11, the sub progress bar 25 indicating the specific portion 21a which is separated from the progress bar 11, and into which the memo A1 is inserted, the sub progress bar 25 may be inserted into the certain portion 26.

Figure 30:
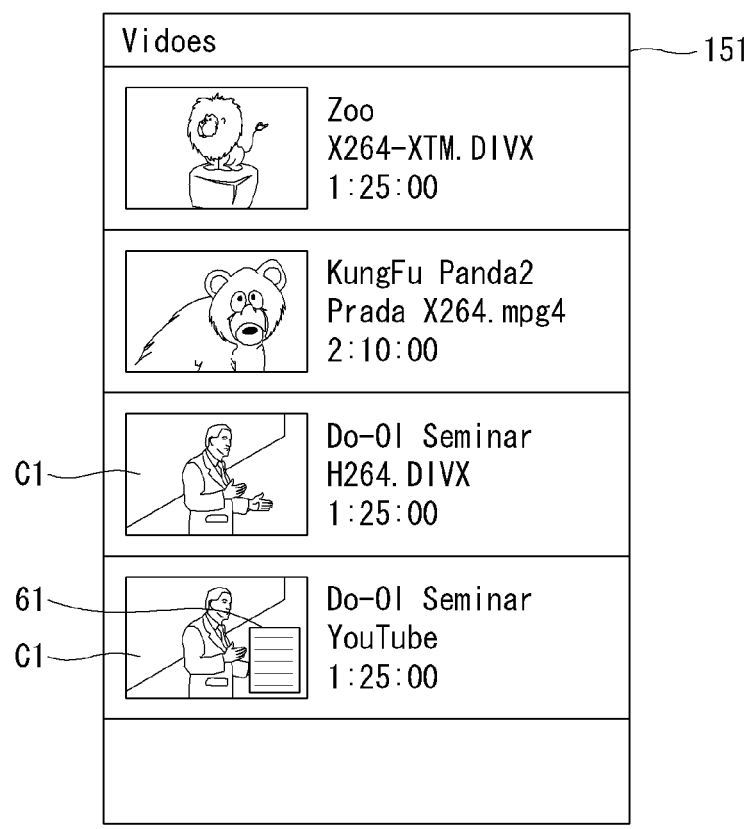
FIGS. 30 and 31 are views for explaining a method for controlling a mobile terminal according to a fifth embodiment of the present invention.
Figure 31:
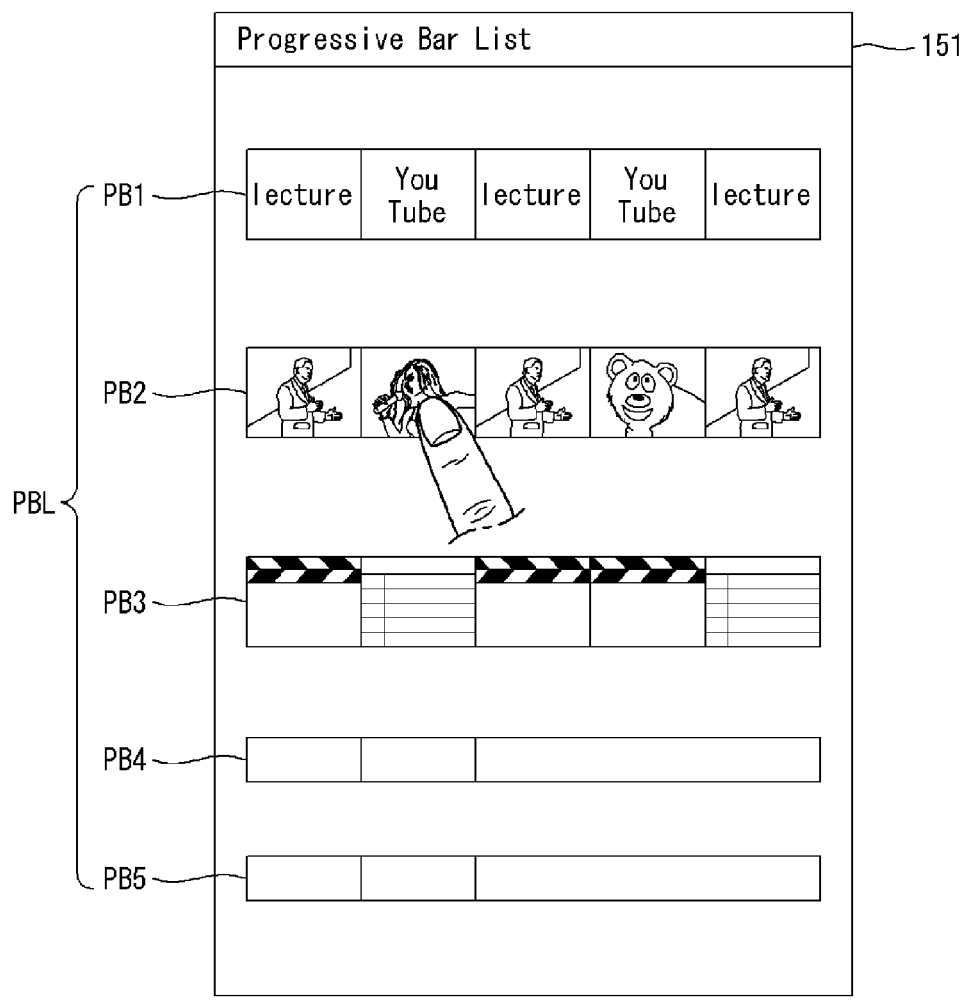

FIGS. 30 and 31 are views for explaining a method for controlling a mobile terminal according to a fifth embodiment of the present invention.

The above control method may be implemented in the mobile terminal 100 explained with reference to FIG. 1. Hereinafter, the operation of the mobile terminal according to the fifth embodiment of the present invention will be described with reference to necessary drawings.

Referring to FIG. 30, according to the fifth embodiment of the present invention, appropriate content may be added to a user-desired playback portion through a simple operation on a progress bar for controlling the playback (or running) of the first content C1 during running of the first content C1.

The controller 180 displays a content list on the touch screen 151 as shown in FIG. 30. Also, the controller 180 may display an identifier for identifying content to which the operation on the progress bar is applied, out of the contents contained in the content list.

For example, referring to FIG. 30, when inserting a predetermined memo into a specific portion of the first content C1 by running the memo application through an operation on the progress bar, a memo application icon 61 can also be displayed on the icon of the first content C1.

Referring to FIG. 31, the controller 180 can store new progress bars, which are created according to the first to fourth embodiments of the present invention, in the memory 160.

Referring to FIG. 31, the controller 180 can map text, a representative image, a content identifying icon, etc. to each specific portion and save them in the memory 160 in order to identify content corresponding to a specific portion of the progress bar.

For example, referring to FIG. 31, the controller 180 can insert YouTube video into at least one specific portion during the playback of a video lecture and input text into each portion of the progress bar PB1 and save it in the memory 160 (PB1).

Moreover, the controller 180 can map a representative image of the video played in each portion and save it the memory 160 (PB2).

In addition, the controller 180 can map an application icon played in each portion and save it in the memory 160 (PB3).

Further, the controller 180 can display a progress bar list including at least one saved progress bar on the touch screen 151.

Besides, if it selects a specific progress bar from the progress bar list, the controller 180 can play the video corresponding to the selected progress bar.

According to the method for controlling a mobile terminal according to the fifth embodiment of the present invention, the user can access a desired video and a specific portion of the video with more ease by displaying the attributes of content mapped to each portion of one progress bar directly on the progress bar.

The attributes of content denote identification information for identifying content for each portion from other content. For example, the attributes of content may be represented by text, images, icons, etc.

Figure 32:
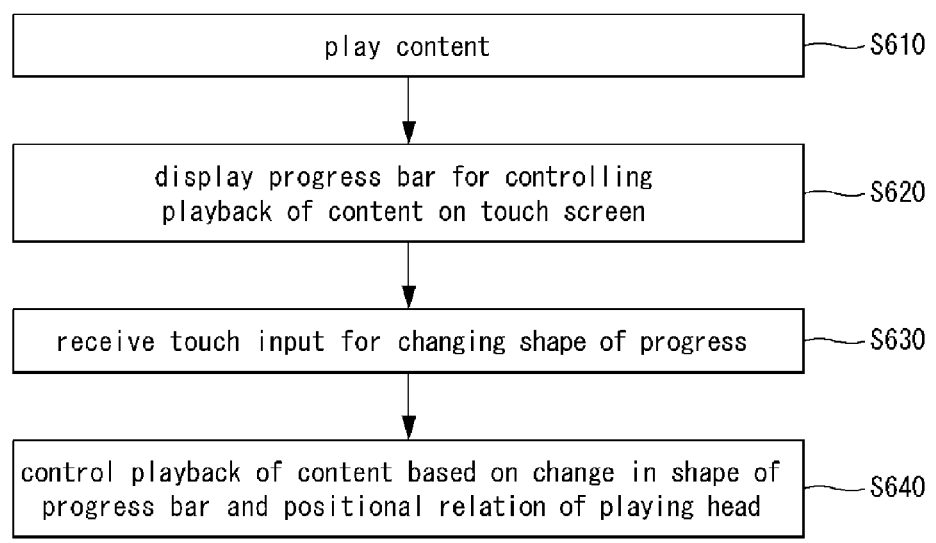
FIG. 32 is a flowchart for explaining a method for controlling a mobile terminal according to a sixth embodiment of the present invention.

FIG. 32 is a flowchart for explaining a method for controlling a mobile terminal according to a sixth embodiment of the present invention. FIGS. 33 to 38 are views for explaining the method for controlling a mobile terminal according to the sixth embodiment of the present invention.

The above control method may be implemented in the mobile terminal 100 explained with reference to FIG. 1. Hereinafter, the operation of the mobile terminal according to the sixth embodiment of the present invention will be described with reference to necessary drawings.

Referring to FIG. 32, the controller 180 of the mobile terminal can run content (S610). The content may be time-based content. The content may include video, and the controller 180 can play the video through the touch screen 151.

The controller 180 can display a progress bar for controlling the playback of the content on the touch screen 151 (S620).

The controller 180 can receive a touch input for changing the shape of the progress bar (S630). For example, referring to FIG. 33, the shape of the progress bar can be changed by selecting a specific point 63 on the progress bar 60 and moving the selected point in a predetermined direction.

The controller 180 can control the playback of content based on the change in the shape of the progress bar and the positional relation of the playing head (S640).

The controller 180 can determine the playback direction of content based on the change in the shape of the progress bar.

More specifically, a specific point on the progress bar can be selected, and an input for dragging the specific point in a direction perpendicular to the traveling direction of the playing head included in the progress bar.

Figure 33:
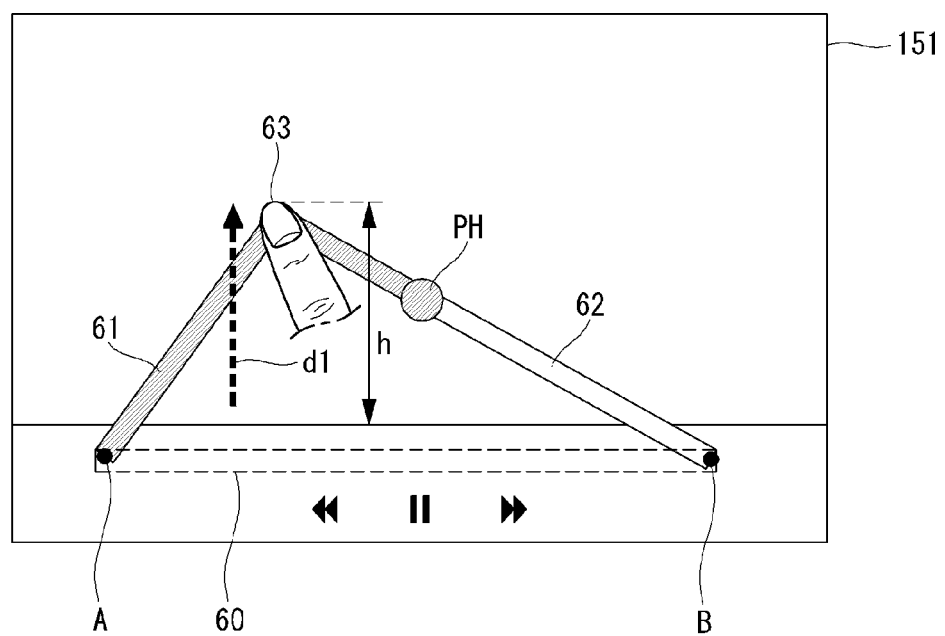
FIGS. 33 to 38 are views for explaining the method for controlling a mobile terminal according to the sixth embodiment of the present invention.

For example, referring to FIG. 33, the progress bar 60 is a real object having flexibility, and if a specific point 63 is selected and dragged upwards, only the specific point 63 can be moved in the dragging direction, with both of the ends A and B of the progress bar 60 being fixed. In this case, the progress bar 60 can be divided into a first progress bar 61 and a second progress bar 62 relative to the specific point 63.

The first progress bar 61 and the second progress bar 62 may have opposite slopes. The slopes may be varied depending on the height h of the specific point 63. That is, the longer the specific point 63 is dragged in a first direction d1, the greater the slopes of the first progress bar 61 and second progress bar 62.

Figure 34:
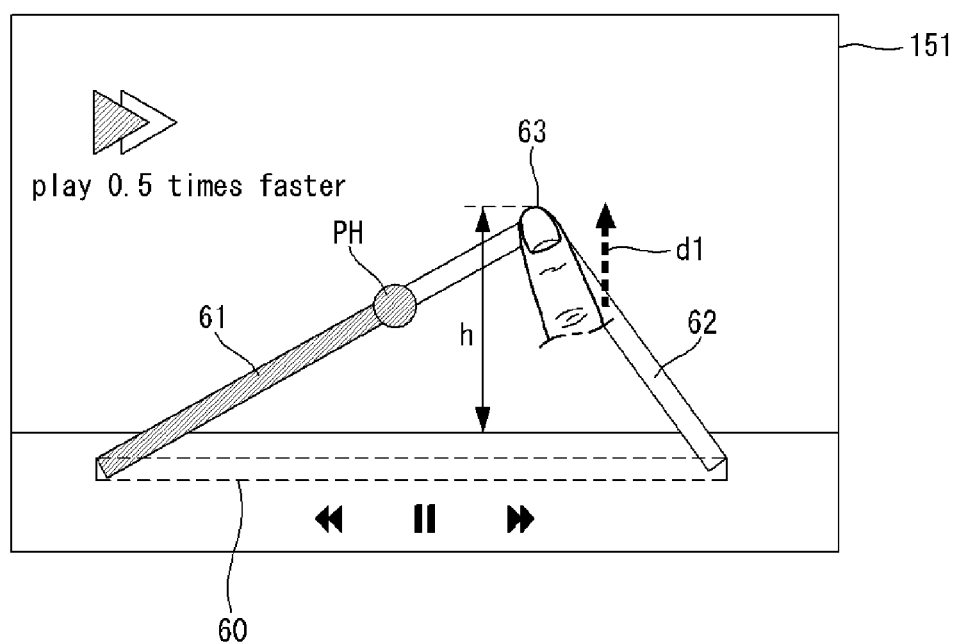

Meanwhile, referring to FIGS. 33 and 34, if the direction of dragging the specific point 63 is the first direction d1, the controller 180 can play the content in a normal direction. The normal direction refers to a direction in which the content is played forward.

Figure 35:
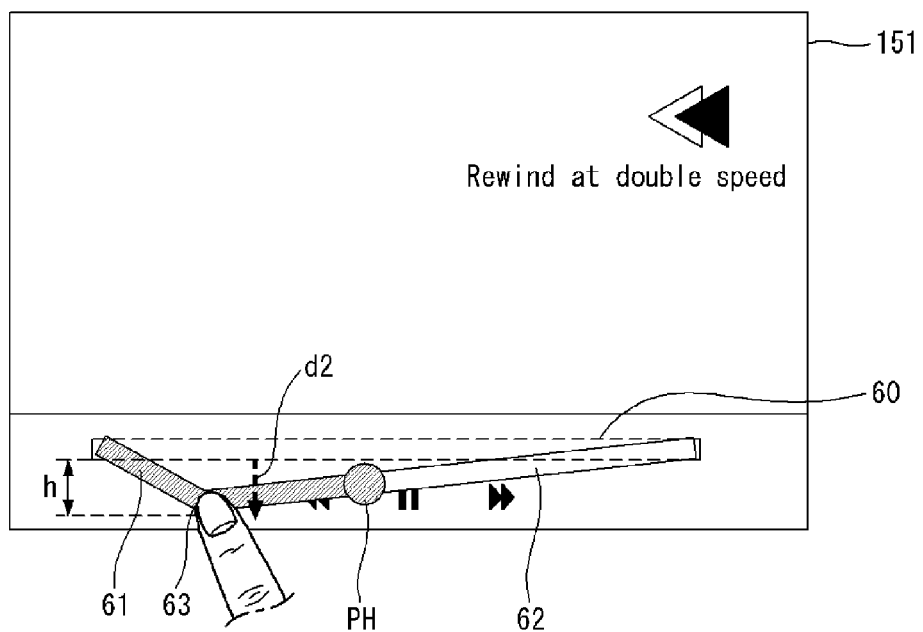
Figure 36:
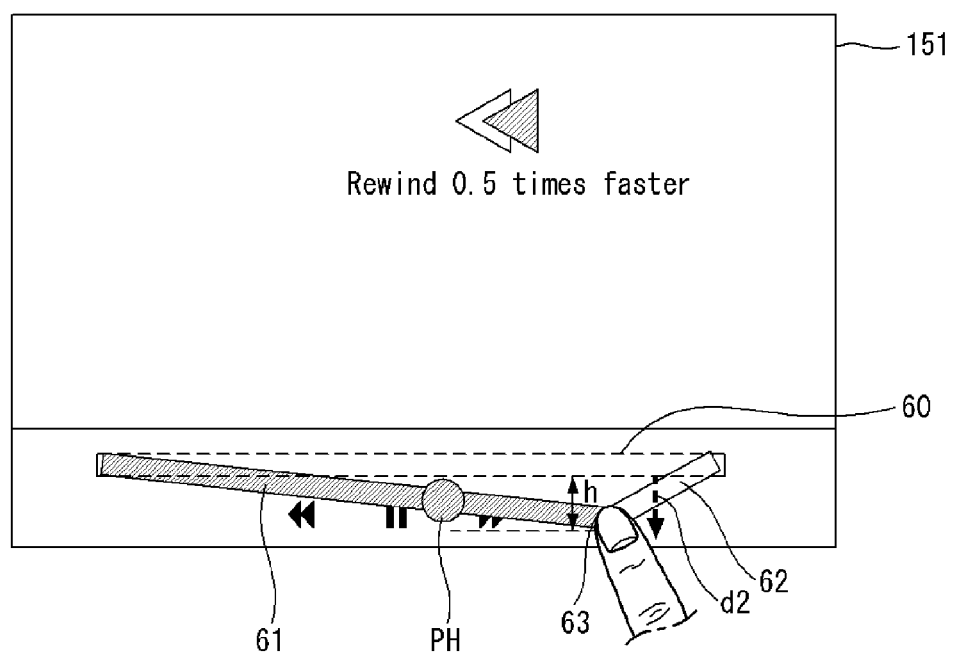

However, referring to FIGS. 35 and 36, if the direction of dragging the specific point 63 is the second direction d2, which is opposite to the first direction d1, the controller 180 can rewind the content.

Accordingly, according to the sixth embodiment of the present invention, the playback direction of the content can be controlled depending on the dragging direction by extending the entire length of the progress bar and dragging a specific point of the progress bar in a predetermined direction.

According to the sixth embodiment of the present invention, when the content playback direction is determined after the specific point on the progress bar is dragged in a predetermined direction, the controller 180 can determine the playback speed in the predetermined direction depending on whether the position of the playing head is on the first progress bar 61 or the second progress bar 62.

For example, referring to FIG. 33, the playing head PH is on the second progress bar 62, and the playback direction of the content is a normal direction. In this case, the controller 180 can control the playing head PH to be displayed as if descending along the slope of the second progress bar 62. Thus, the controller 180 may detect that the playing head PH is given a positive (+) acceleration along the second progress bar 62 to thus make the playback speed faster.

For example, referring to FIG. 34, the playing head PH is on the first progress bar 61, and the playback direction of the content is a normal direction. In this case, the controller 180 can control the playing head PH to be displayed as if ascending along the slope of the first progress bar 61. Thus, the controller 180 may detect that the playing head PH is given a negative (−) acceleration along the second progress bar 61 to thus make the playback speed slower.

For example, referring to FIG. 35, the playing head PH is on the second progress bar 62, and the content is rewound and the movement direction of the playing head PH is changed from left to right, unlike FIGS. 33 and 34. In this case, the controller 180 can control the playing head PH to be displayed as if descending along the slope of the second progress bar 62. Thus, the controller 180 may detect that the playing head PH is given a positive (+) acceleration along the second progress bar 62 to thus make the rewind speed of the content faster.

For example, referring to FIG. 36, if the playing head PH is on the first progress bar 61, the rewind speed may be slowed down, which is contrary to the previous example shown in FIG. 35.

The playback speed and rewind speed of the content in the foregoing embodiments are relative to the moving speed of the playing head PH on the original progress bar 60; that is, the moving speed of the playing head PH when there is any change at all in the shape of the progress bar.

The playback speed and rewind speed of the content may be proportional to the degree of change made to the progress bar (e.g., the dragging length of the specific point 63). For example, the greater the dragging length of the specific point 63 on the progress bar, the faster the playback speed and also the faster the rewind speed.

Figure 37:
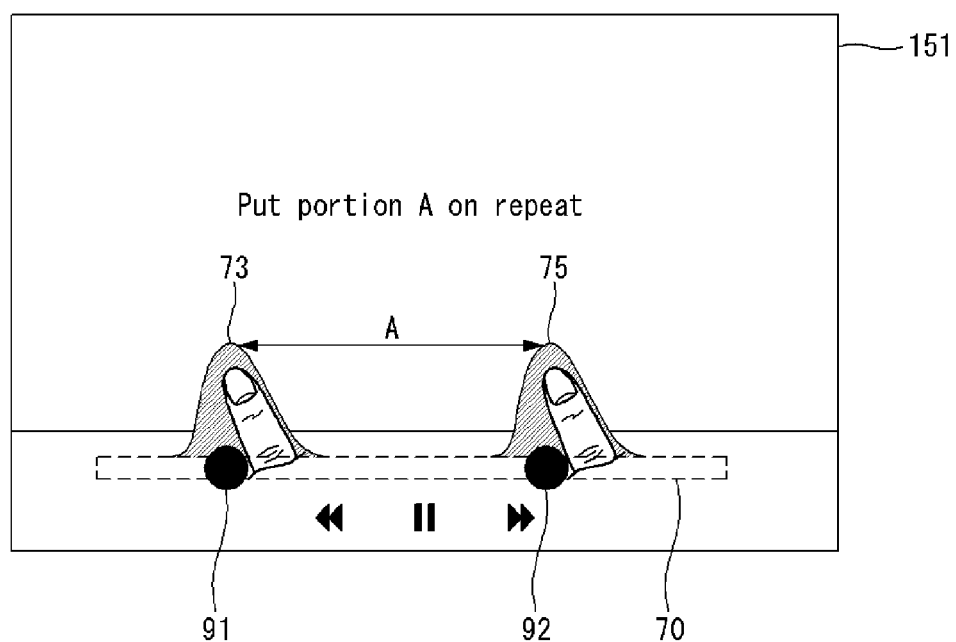
Figure 38:
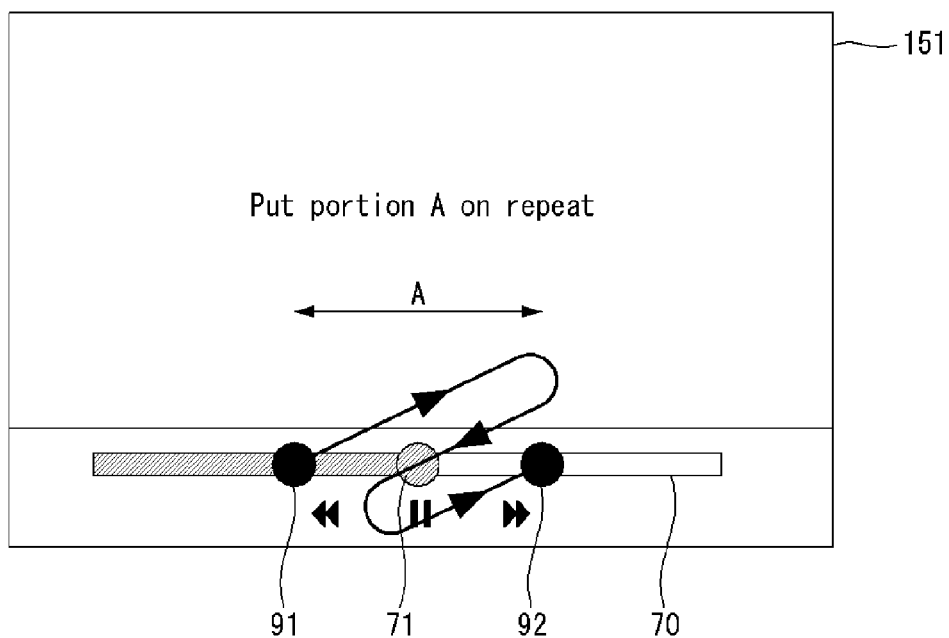

FIGS. 37 and 38 are views for explaining an operation of playing a specific portion on repeat in response to a change in the shape of the progress bar.

Referring to FIG. 37, an input for dragging two points 91 and 92 on a progress bar 70 vertically upwards may be received. Moreover, the playing head PH of the progress bar 70 is between the two points 91 and 92. In this case, the controller 180 can set the portion between the two points 91 and 92 as a playback portion, and play content on repeat during the playback portion.

Referring to FIG. 38, the playing head 71 of the progress bar moves along the progress bar, and can play the portion between the two points 91 and 92 on the progress bar during the playback of portion A.

The foregoing description has been given of an example where the playback pattern of content being played is changed by changing the shape of the progress bar. However, the present invention is not limited to the previous embodiments, but may be modified and embodied in various other forms.

The mobile terminal and the method for controlling the same according to an embodiment of the present invention have the following effects:

According to the present invention, content running can be controlled more easily in a way that the user wants by various touch inputs on a progress bar for controlling content running.

Moreover, frames corresponding to a given portion can be controlled more easily by modifying multi-touch inputs on the progress bar.

Furthermore, the original content can be edited more easily according to user's preference by modifying multi-touch inputs on the progress bar.

In addition, user's access to edited content can be increased by presenting the edited content to the user in a progress bar format.

The method for controlling of the mobile terminal according to embodiments of the present invention may be recorded in a computer-readable recording medium as a program to be executed in the computer and provided. Further, the method for controlling a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD?ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touch screen configured to display information; and
a controller configured to:
control the touch screen to display first content and a primary progress bar for controlling playback of the first content;
receive at least one touch input on the primary progress bar, the at least one touch input defining an interval corresponding to a first portion of the first content; and
control the touch screen to display the first content and the first portion on split sections of the touch screen in response to the at least one touch input; and
control the touch screen to display a secondary progress bar overlapped with the primary progress bar for controlling the playback of the first portion; and
control the touch screen to display a primary progress indicator of the primary progress bar and a secondary progress indicator of the secondary progress bar, wherein a position of the primary progress indicator and a position of the secondary progress indicator are changed over time.

2. The mobile terminal of claim 1, wherein the at least one touch input comprises:
a simultaneous selection of two points on the primary progress bar; and
a drag input varying a distance between the two selected points.

3. The mobile terminal of claim 1, wherein the controller is further configured to control the touch screen to display the secondary progress bar overlapped with the primary progress bar such that a start point of the secondary progress bar and an end point of the secondary progress bar are identifiable.

4. The mobile terminal of claim 3, wherein the controller is further configured to control the touch screen to no longer display split sections of the touch screen when the position of the primary progress indicator and the position of the secondary progress indicator are the same.

5. A mobile terminal comprising:
a touch screen configured to display information; and
a controller configured to:
control the touch screen to display first content and display a primary progress bar for controlling playback of the first content;
receive at least one touch input on the primary progress bar, the at least one touch input comprising:
a selective touch input selecting two points on the primary progress bar, the two points defining an interval corresponding to a first portion of the first content, and
a drag input dragging the selective touch input in a direction away from the primary progress bar;
control the touch screen to display a secondary progress bar overlapped with the primary progress bar for controlling playback of the first portion; and
control the touch screen to display a primary progress indicator of the primary progress bar and a secondary progress indicator of the secondary progress bar, wherein a position of the primary progress indicator and a position of the secondary progress indicator are changed over time.

6. The mobile terminal of claim 5, wherein the controller is further configured to control the touch screen to display the first content and the first portion on split screen sections in response to the at least one touch input.

7. The mobile terminal of claim 5, wherein the controller is further configured to control the touch screen to display at least one thumbnail image each associated with specific content of the first portion in response to the at least one touch input.

8. The mobile terminal of claim 7, wherein:
the at least one thumbnail image is selectable; and
the controller is further configured to:
process an input for selecting one of the at least one thumbnail image; and
control the touch screen to display:
specific content of the first portion associated with the selected thumbnail image;
a secondary progress bar for controlling playback of the first portion; and
a progress indicator of the primary progress bar moved to a position on the secondary progress bar corresponding to the specific content of the first portion being displayed.

9. The mobile terminal of claim 7 further comprising a memory, wherein the controller is further configured to control the memory to store at least one preview data associated with the interval, the at least one preview data comprising positions of the selected two points on the primary progress bar and the at least one thumbnail image.

10. The mobile terminal of claim 9, wherein the controller is further configured to control the touch screen to display the stored at least one preview data in response to a predetermined touch input received via the touch screen.

11. The mobile terminal of claim 5, wherein the controller is further configured to remove the first portion from the first content in response to the at least one touch input.

12. The mobile terminal of claim 11, wherein the controller is further configured to insert second content into the interval of the first content previously occupied by the removed first portion in response to a user input selecting the second content for insertion.

13. The mobile terminal of claim 12, wherein the controller is further configured to control the touch screen to display the first content and the second content on split sections of the touch screen.

14. The mobile terminal of claim 13 further comprising a memory, wherein the controller is further configured to:
control the touch screen to display a secondary progress bar for controlling the playback of the second content; and
control the memory to store progress bar data associated with the second content, the progress bar data comprising a start position of the secondary progress bar and an end position of the secondary progress bar.

15. The mobile terminal of claim 14, wherein the controller is further configured to:
process a touch input for selecting a stored progress bar data;
control the touch screen to display:
at least one stored progress bar data selectable via a touch input, and
the second content associated with the selected stored progress bar data.

16. The mobile terminal of claim 15, wherein the controller is further configured to control the touch screen to display at least one identifier identifying content and an interval corresponding to the content on at least the primary progress bar or the secondary progress bar.

17. The mobile terminal of claim 13 wherein the second content is a still image, a video, or an application.

18. A method for controlling a mobile terminal, the method comprising:
displaying first content and a progress bar for controlling the first content on a touch screen of the mobile terminal;
receiving a first touch input on the progress bar defining an interval corresponding to a first portion of the first content; and
executing an action related to the first portion in response to receiving a second touch input;
displaying a secondary progress bar overlapped with the primary progress bar for controlling playback of the first portion;
displaying a primary progress indicator of the primary progress bar and a secondary progress indicator of the secondary progress bar, wherein a position of the primary progress indicator and a position of the secondary progress indicator are changed over time.

19. The method of claim 18 further comprising displaying at least one thumbnail image each corresponding to specific content of the first portion in response to the first touch input;
wherein the second touch input comprises a selection of one of the at least one thumbnail image and the action comprises displaying the corresponding specific content of the first portion on a split section of the touch screen.

20. The method of claim 18, wherein:
the second touch input comprises a drag input dragging the first touch input away from the progress bar; and
the action comprises removing the first portion from the first content.

21. The method of claim 20, further comprising inserting second content into the interval of the first content previously occupied by the removed first portion in response to a selection of the second content for insertion.

* * * * *